US009345035B2

(12) United States Patent
Liu et al.

(10) Patent No.: US 9,345,035 B2
(45) Date of Patent: May 17, 2016

(54) CENTRALIZED CHANNEL SELECTION METHOD AND APPARATUS FOR WIRELESS NETWORKS IN A DENSE DEPLOYMENT ENVIRONMENT

(71) Applicant: THOMSON LICENSING, Issy de Moulineaux (FR)

(72) Inventors: Hang Liu, North Potomac, MD (US); Ishan Mandrekar, Monmouth Junction, NJ (US); Ramkumar Perumanam, Carmel, IN (US); Mingquan Wu, Princeton, NJ (US); Saurabh Mathur, Danville, CA (US)

(73) Assignee: THOMSON LICENSING, Issy les Moulineaux (FR)

( * ) Notice: Subject to any disclaimer, the term of this patent is extended or adjusted under 35 U.S.C. 154(b) by 43 days.

(21) Appl. No.: 14/591,220

(22) Filed: Jan. 7, 2015

(65) Prior Publication Data
US 2015/0117388 A1   Apr. 30, 2015

Related U.S. Application Data

(63) Continuation of application No. 14/053,730, filed on Oct. 15, 2013, now Pat. No. 8,964,606, which is a continuation of application No. 13/138,387, filed as application No. PCT/US2009/001015 on Feb. 18, 2009, now Pat. No. 8,588,113.

(51) Int. Cl.
*H04W 72/08*   (2009.01)
*H04W 72/04*   (2009.01)
(Continued)

(52) U.S. Cl.
CPC ............ *H04W 72/082* (2013.01); *H04W 24/10* (2013.01); *H04W 48/16* (2013.01); *H04W 72/042* (2013.01); *H04W 72/044* (2013.01); *H04W 74/0808* (2013.01)

(58) Field of Classification Search
CPC ............ H04W 72/042; H04W 72/044; H04W 72/082; H04W 74/0808; H04W 48/16; H04W 24/10
See application file for complete search history.

(56) References Cited

U.S. PATENT DOCUMENTS 5,884,145 A   3/1999   Haartsen
6,567,397 B1  5/2003   Campana, Jr. et al.
(Continued)

FOREIGN PATENT DOCUMENTS

EP   1615388       1/2006
EP   2020779        2/2009
WO   WO2005112358  11/2005

OTHER PUBLICATIONS

Bakhshi et al., "A Maximum Fair Bandwidth Approach for Channel Assignment in Wireless Mesh Networks", Wireless Communications and Networking Conference, IEEE, Piscataway, NJ, Mar. 31, 2008, pp. 2176-2181.

(Continued)

*Primary Examiner* — Jianye Wu
(74) *Attorney, Agent, or Firm* — Brian J. Dorini; Catherine A. Cooper

(57) ABSTRACT

A method and apparatus are described including scanning a channel, generating a report for the scanned channel, transmitting the channel report to an associated access point and receiving a channel assignment responsive to said channel report. Also described are a method and apparatus including scanning a channel, generating a first channel report, receiving a second channel report from an associated client, transmitting the first channel report and the second channel report to a server, receiving a channel assignment message from the server responsive to the first and second channel reports and transmitting the channel assignment message to the associated client. Further described are a method and apparatus including receiving a channel report from an associated access point, building an interference graph responsive to the channel report, determining channel assignments based on the interference graph and transmitting a channel assignment message to the associated access point.

17 Claims, 16 Drawing Sheets

(51) Int. Cl.
*H04W 24/10* (2009.01)
*H04W 48/16* (2009.01)
*H04W 74/08* (2009.01)

(56) References Cited

U.S. PATENT DOCUMENTS

| | | | |
|---|---|---|---|
| 6,996,075 B2 | 2/2006 | Santhoff et al. | |
| 8,588,113 B2 * | 11/2013 | Wu et al. | 370/278 |
| 2005/0047383 A1 * | 3/2005 | Yoshida | 370/338 |
| 2005/0245258 A1 * | 11/2005 | Classon et al. | 455/434 |
| 2008/0101331 A1 | 5/2008 | Lee et al. | |
| 2008/0130573 A1 | 6/2008 | Lee et al. | |
| 2009/0129331 A1 | 5/2009 | Wu et al. | |
| 2009/0291692 A1 | 11/2009 | Kazmi et al. | |

OTHER PUBLICATIONS

Chan et al., "A Jumping-Genes Paradigm for Optimizing Factory WLAN Network", IEEE Transactions on Industrial Informatics, vol. 3, No. 1, IEEE, New York, NY, Feb. 1, 2007, pp. 33-43.

Zhang et al., "Mitigation of Exposed Terminal Problem Using Packet Sensing", 6th Annual Communication Networks and Services Research Conference, CNSR 2008, IEEE, Piscataway, NJ, May 5, 2008, pp. 263-269.

Wu et al.: "Channel Selection for Video Distribution Over WLANs in Dense Deployment", Thomson Inc., Princeton, New Jersey, six pages, Apr. 7, 2009.

* cited by examiner

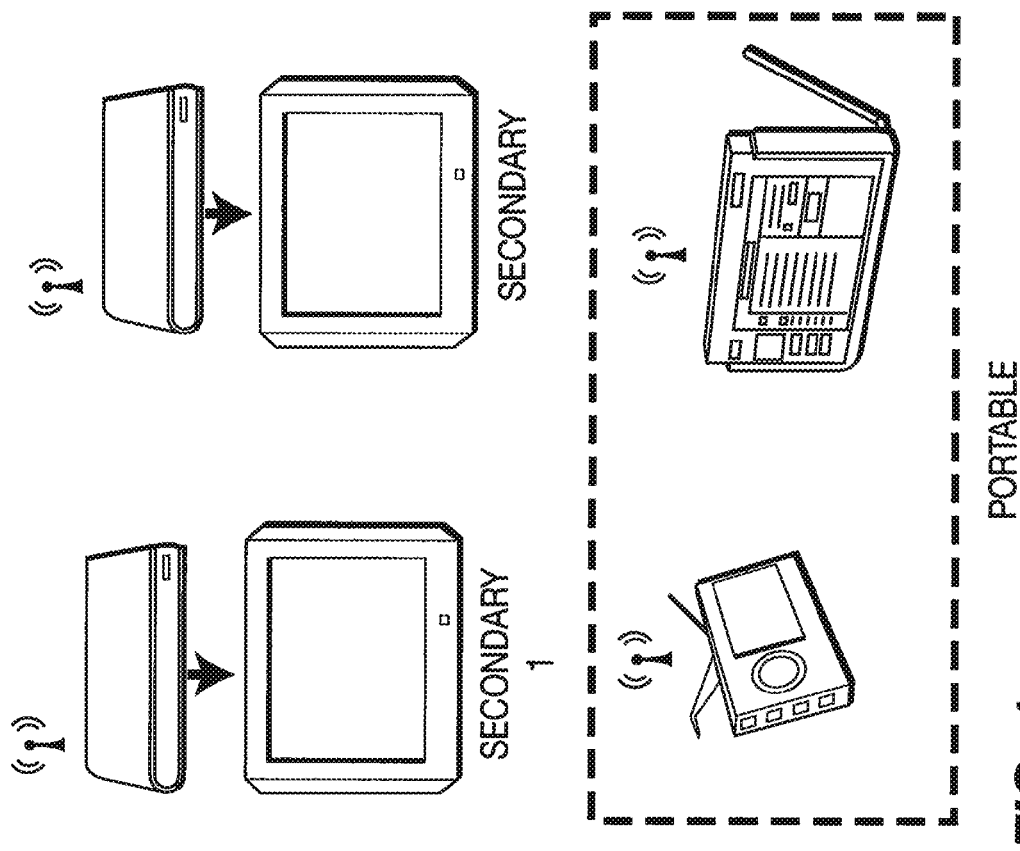
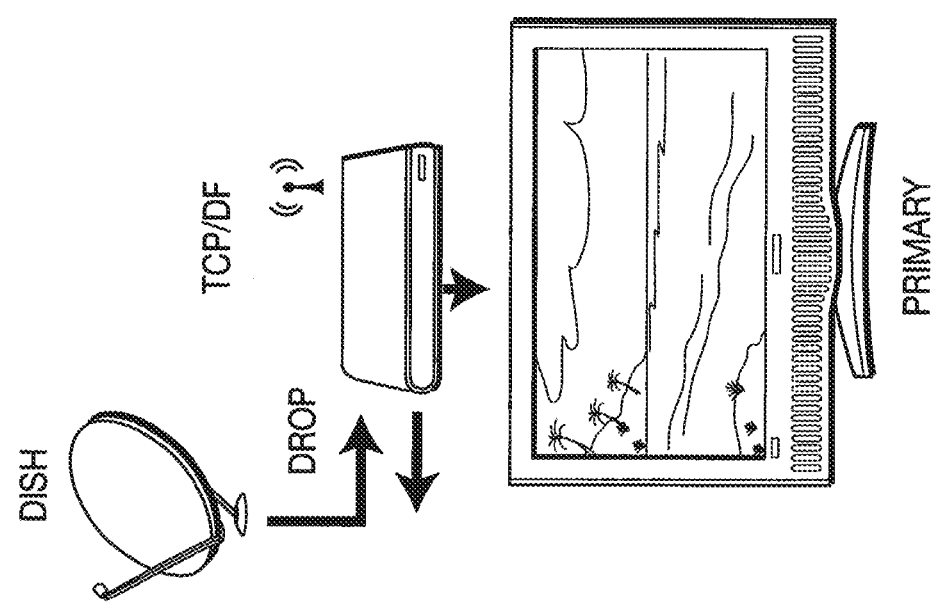
FIG. 1

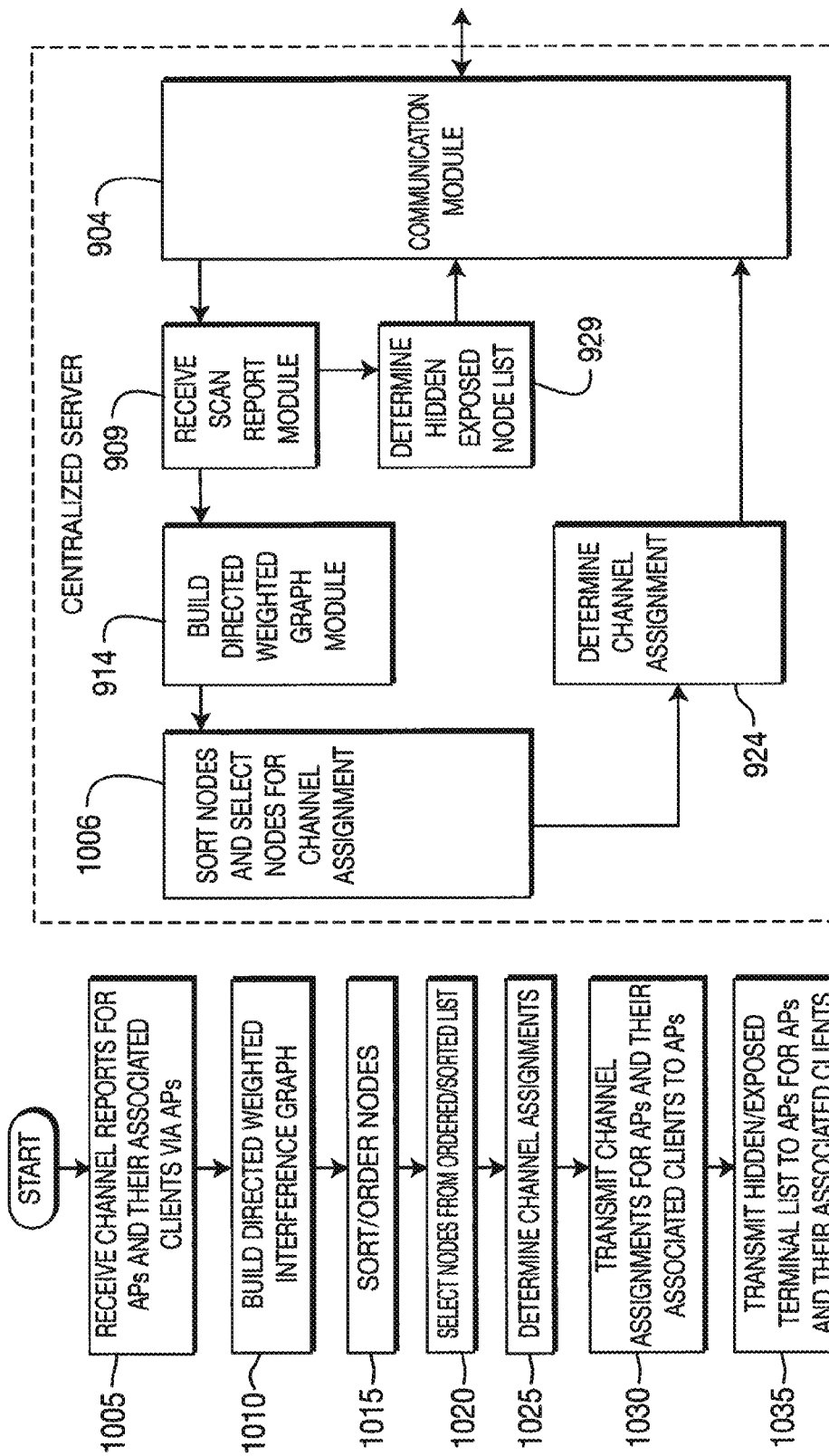

CENTRALIZED CHANNEL SELECTION METHOD AND APPARATUS FOR WIRELESS NETWORKS IN A DENSE DEPLOYMENT ENVIRONMENT

RELATED APPLICATIONS

This application is a continuation of co-pending U.S. application Ser. No. 14/053,730, filed Oct. 15, 2013, which is a continuation of U.S. application Ser. No. 13/138,387, filed Aug. 8, 2011 now U.S. Pat. No. 8,588,113, which is a 371 of International Application No. PCT/US2009/001015 filed Feb. 18, 2009, herein incorporated by reference.

FIELD OF THE INVENTION

The present invention relates generally to wireless local area networks (WLANs) and, in particular, to channel assignment methods and apparatus in dense deployment environments.

BACKGROUND OF THE INVENTION

As used herein, "/" denotes alternative names for the same or similar components or structures. That is, a "/" can be taken as meaning "or" as used herein. Unicast transmissions are between a single sender/transmitter and a single receiver. Broadcast transmissions are between a single sender/transmitter and all receivers within receiving range of the transmitter. Multicast transmissions are between a single sender/transmitter and a subset of the receivers within receiving range of the transmitter where the subset of receivers with receiving range of the transmitter may be the entire set. That is, multicast may include broadcast and is therefore a broader term than broadcast as used herein. Data/content is transmitted in packets or frames. As used herein a station can be a node or a client device, which can be a mobile terminal or mobile device such as, but not limited to, a computer, laptop, personal digital assistant (PDA) or dual mode smart phone. Specifically, a wireless device may be a mobile device but a wireless device may also be fixed and not moving for a particular period of time.

Recently there has been a rapid and significant increase of wireless network deployment on school and work campuses, in shopping malls, at libraries, airports, at homes, etc. Emerging technologies such as IEEE 802.11n make delivering multimedia content over wireless links possible. Thus, the technology is being driven deeper into our daily lives. The number of interference free channels is limited. In a dense deployment environment, wireless networks tend to interfere with each other. This interference impacts the throughput of wireless networks and thus, the quality of service for multimedia streaming applications. The present invention is directed to channel assignment methods and apparatus that will optimize the channel usage, promote channel reuse and improve the throughput as well as quality of service for multimedia applications.

A great deal of work has been done regarding channel assignment in cellular networks. The infrastructure of a cellular network is, however, quite different from that of an IEEE 802.11 wireless local area network. In a cellular network, each base station may have one or more channels. Through careful channel planning by the operator to avoid interference, neighboring base stations will not share the same channel. An IEEE 802.11 wireless local area network may include one or more basic service sets (BSS). Each BSS includes an access point (AP) and the clients that are associated with the AP. Each BSS is assigned one channel. The AP and the clients share the same channel using carrier sense multiple access/collision avoidance (CSMA/CA) MAC layer protocol. In fact, based on CSMA/CA, two or more neighboring BSSs may share the same channel if the sum of the load of each BSSs is less than the channel capacity.

Channel assignment has also been studied extensively in multihop wireless networks such as wireless mesh and ad hoc networks. Existing multihop wireless networks often use off-the-shelf IEEE 802.11 MAC layer protocol products and algorithms. Data or content may need to be transmitted over multiple wireless hops before reaching a destination. Conventional channel assignment algorithms in multihop wireless networks often assume a mobile device in the network has two or more wireless interfaces, and conventional channel assignment algorithms are further constrained by issues such as routing efficiency and connectivity of the network. These algorithms do not work well for densely deployed wireless local area networks operating in the infrastructure mode.

Conventional channel assignment methods for WLANs adopt a static, one-time channel assignment approach. A network administrator conducts a site survey and layout planning, and then manually assign channels to APs such that the assignments experience minimum interference. This approach does not adapt well to a dynamic environment. Recent proposals have focused on automatic channel assignment. In one such proposal, the least congested channel selection (LCCS) algorithm, the AP periodically scans the channels and selects the least congested channel. LCCS is AP-centric in nature. It does not detect any client side conflicts. In another recent proposal, a client-driven approach for channel assignments targeted conventional WLANs and is not suitable for WLANs that are designed specifically for multimedia applications where there are strict constraints on the demand and bit rate for each client. In another recent proposal, the demand at each demand point needs to be explicitly specified, and channels are assigned to APs such that channel usage is maximized. However, in the problem formulation, it was assumed that interference between APs was symmetric, and neighboring APs were assigned to interference free channels. This is not necessarily true in practical deployments, as neighboring APs may have different power levels and thus different interference ranges, so the interference may not be symmetric. Also if the total demand on neighboring APs is lower than the channel capacity, neighboring APs can be assigned the same channel. In yet another recent proposal, a traffic aware channel assignment method was introduced. However, this model also assumed symmetric interference and did not address the hidden and exposed terminal problem.

IEEE 802.11h has defined dynamic frequency selection (DFS). DFS selects a channel for a mobile device to avoid interference with radar and/or satellite signals, and is not designed to improve the over all performance of a wireless network in a dense deployment environment.

SUMMARY OF THE INVENTION

Recently there has been a rapid and significant increase of wireless network deployment on school and work campuses, in shopping malls, at libraries, airports, at homes, etc. Emerging technologies such as IEEE 802.11n make delivering multimedia content over wireless links possible. Thus, the technology is being driven deeper into our daily lives. The number of interference free channels is limited. In a dense deployment environment, wireless networks tend to interfere with each other. This interference impacts the throughput of wireless networks and thus, the quality of service for multimedia streaming applications. The present invention is directed to channel assignment methods and apparatus that will optimize the channel usage, promote channel reuse and improve the throughput as well as quality of service for multimedia applications.

The present invention is unique in that:

(1) A directed edge weighted graph to model the interference between different BSSs is built.

(2) The concept of cooperative BSSs and non-cooperative BSSs is introduced in the interference graph, where cooperative BSSs are managed by a centralized administrator and non-cooperative BSSs work independently.

(3) Each BSS maintains two lists. One list includes a set of BSSs that, if assigned to the same channel as this BSS, causes a hidden terminal problem for this BSS. The other list includes BSSs that, if assigned to the same channel as this BSS, causes an exposed terminal problem for this BSS. If this BSS is assigned the same channel as one or more BSS in these two lists, then RTS/CTS signaling is activated to solve the hidden or exposed terminal problem.

(4) The method and apparatus of the present invention is specifically designed for multimedia applications. That is, the present invention is directed to finding a feasible solution that satisfies the demand of each client to guarantee quality of service. If no feasible solution can be found, then the method and apparatus of the present invention finds the least infeasible solution. That is, the best solution is found, with the best solution defined as the solution that would cause the least interference. The present invention can also be used for channel assignment for conventional wireless networks.

(5) The present invention also overcomes the stability problem when the centralized assignment method is used for dynamic channel assignment.

In the following sections, a method and apparatus for building a directed edge weighted interference graph are described. Based on the interference graph, both optimized and heuristic centralized channel assignment methods are described. It should be noted that for simplicity, a directed edge weighted interference graph is sometimes called a directed weighted graph or directed weighted interference graph or just an interference graph herein.

A method and apparatus are described including scanning a channel, generating a report for the scanned channel, transmitting the channel report to an associated access point and receiving a channel assignment responsive to the channel report. Also described are a method and apparatus including scanning a channel, generating a first channel report, receiving a second channel report from an associated client, transmitting the first channel report and the second channel report to a server, receiving a channel assignment message from the server responsive to the first and second channel reports and transmitting the channel assignment message to the associated client. Further described are a method and apparatus including receiving a channel report from an associated access point, building an interference graph responsive to the channel report, determining channel assignments based on the interference graph and transmitting a channel assignment message to the associated access point.

BRIEF DESCRIPTION OF THE DRAWINGS

The present invention is best understood from the following detailed description when read in conjunction with the accompanying drawings. The drawings include the following figures briefly described below where like-numbers on the figures represent similar elements:

FIG. 1 shows a typical in-home wireless video distribution system streaming two or three HD/SD TV and video-on-demand (VoD) programs from a master set top box (STB) to slave STBs.

FIG. 10A is a flowchart of the centralized heuristic channel selection/assignment method of the present invention from the perspective of the centralized server.

FIG. 10B is a block diagram of an exemplary embodiment of the present invention from the perspective of the centralized server for heuristic channel selection/assignment method.

DETAILED DESCRIPTION OF THE PREFERRED EMBODIMENTS

Emerging technologies such as orthogonal frequency division multiplexing (OFDM) and multiple in-multiple out (MIMO) make bandwidth demanding multimedia applications over wireless channels possible. In IEEE 802.11n, throughput over a 20 MHz or 40 MHz channel can reach 130 Mbps or 300 Mbps respectively. Transport of a high-definition video stream may need 15 Mbps to 20 Mbps of bandwidth. A typical in-home wireless video distribution system streams two or three HD/SD TV and video-on-demand (VoD) programs from a master set top box (STB) to slave STBs as shown in FIG. 1. For single home deployment, if the distance between homes is large enough, the number of interfering neighbors may be smaller than the total channels available. It would, therefore, be possible for an in-home wireless network to find an interference free channel.

Figure 2:
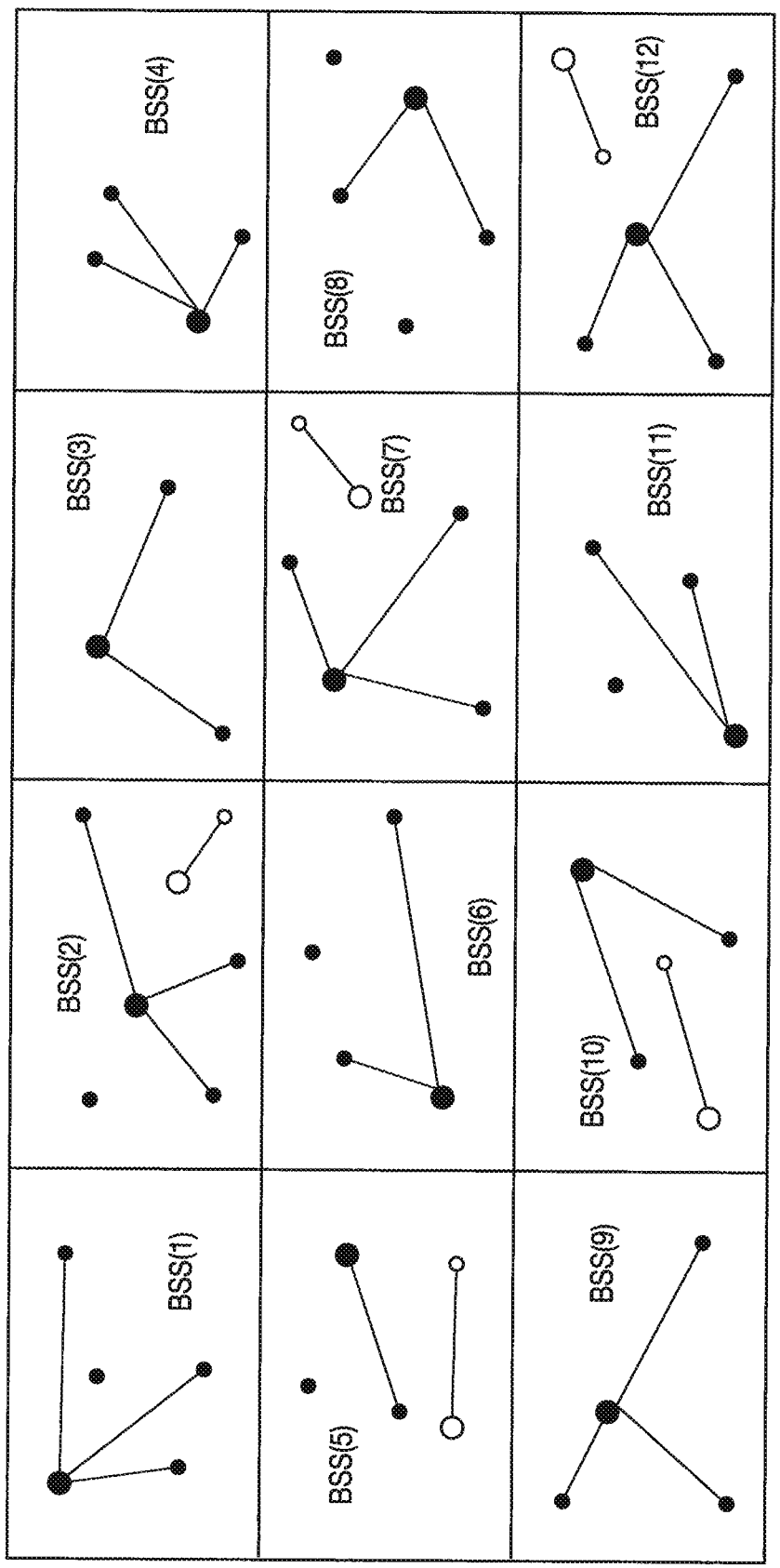
FIG. 2 shows a multi-dwelling unit (MDU) deployment.

This may not be the case for multi-dwelling unit (MDU) deployment as shown in FIG. 2. One AP and its associated STAs form a basic service set (BSS). As used herein, nodes include clients, mobile terminal and mobile devices. Such devices can be, but are not limited to, computers, laptops, personal digital assistants (PDAs), set top boxes and the like. In FIG. 2, the nodes that are filled are APs and stations that are used exclusively for video streaming. These BSSs come from one service provider, and can be managed by a centralized server/administrator. Herein, these BSSs are called cooperative BSSs. The nodes that are not filled in are APs and stations that are used for general data delivery and they may come from other service providers. Herein, these BSSs are called non-cooperative BSSs. A cooperative BSS may be subject to interference from cooperative and non-cooperative BSSs within the same multi-dwelling unit. A cooperative BSS may also be subject to interference from BSSs within neighboring multi-dwelling units and office buildings. In such a dense deployment scenario, the number of interfering neighbors of a BSS may be more than the total number of channels available. Therefore, channel assignment is necessary to minimize the interference and guarantee quality of service. The scenario depicted in FIG. 2 will be used to describe the method of channel assignment of the present invention. It is understood that the method of the present invention can be applied to channel assignment for wireless networks in dense deployment in general.

1. Directed Weighted Edge Interference Graph

Conventional channel assignment is often defined as a graph coloring problem. For IEEE 802.11 wireless networks, before assigning channels to access points, an interference graph is built. In the interference graph, a BSS is collapsed to a node (this is more like a point on the graph as opposed to being a node in the sense of a client), and for any two interfering BSSs, there is a line connecting the two nodes in the interference graph that represent the two BSSs. This simplification may cause some information loss. Different transmission power of APs in different BSSs may cause asymmetric interference. The amount of interference may also be different due to different traffic load. This information is not included in a conventional undirected graph.

In the following, in accordance with the present invention, the interference between different BSSs is modeled as a directed weighted graph. In the directed weighted graph of the present invention, each BSS is also represented by a node. Positive integers are used to index the nodes in the interference graph, with node j representing BSS j. In the following discussion, node j and BSS j may be used interchangeably. If BSS j is in the interference range of BSS k, there will be a directed arc that starts from node k and ends at node j in the interference graph, represented by an ordered pair (k, j). The amount of the interference from BSS k to BSS j is represented by the weight $w_{kj}$ of the arc (k, j). In the present invention, $w_{kj}$ represents the time fraction that stations in BSS j cannot transmit or receive data due to interference from BSS k. The value of $w_{kj}$ is related to the interference scenario between BSS k and BSS j. Because multimedia distribution applications are assumed, most of the traffic/data/content is downlink data/content/traffic that is transmitted from the AP to its associated clients/nodes, only the interference that is produced by the APs in the BSSs is considered. The load of a BSS is represented by weight of a directed circle. That is, a directed circle is an arc that starts and ends at the node representing the BSS. Neighboring APs communicating on the same channel may also cause hidden terminal and/or exposed terminal problems but this information is not included in the interference graph. In the present invention, each AP maintains a list of interfering APs that would cause hidden and/or exposed terminal problems if they were assigned to the same channel.

If a client needs to receive a video stream with a bit rate of α, the maximum link bit rate that the AP can use to transmit data to this client, satisfying certain quality of service constraints, is β. The average time fraction of this client using the channel would thus be: μ=α/β. In fact, the demand for all clients, with different applications and quality of service requests, can be represented by their channel usage μ. The total load of a BSS is the sum of the channel usages of all of its associated clients. For BSS j, the total load is represented by $\mu_j$, the weight for the directed circle on node j would thus be:

$$w_{jj}=\mu_j \quad (1)$$

In the following, examples are used to show how to build a directed graph for different interference scenarios as well as how to calculate the weight of an arc that represents the amount of interference. While all possible interference scenarios are not shown, it is understood that modeling other interference scenarios can be achieved using similar methods.

Figure 3A:
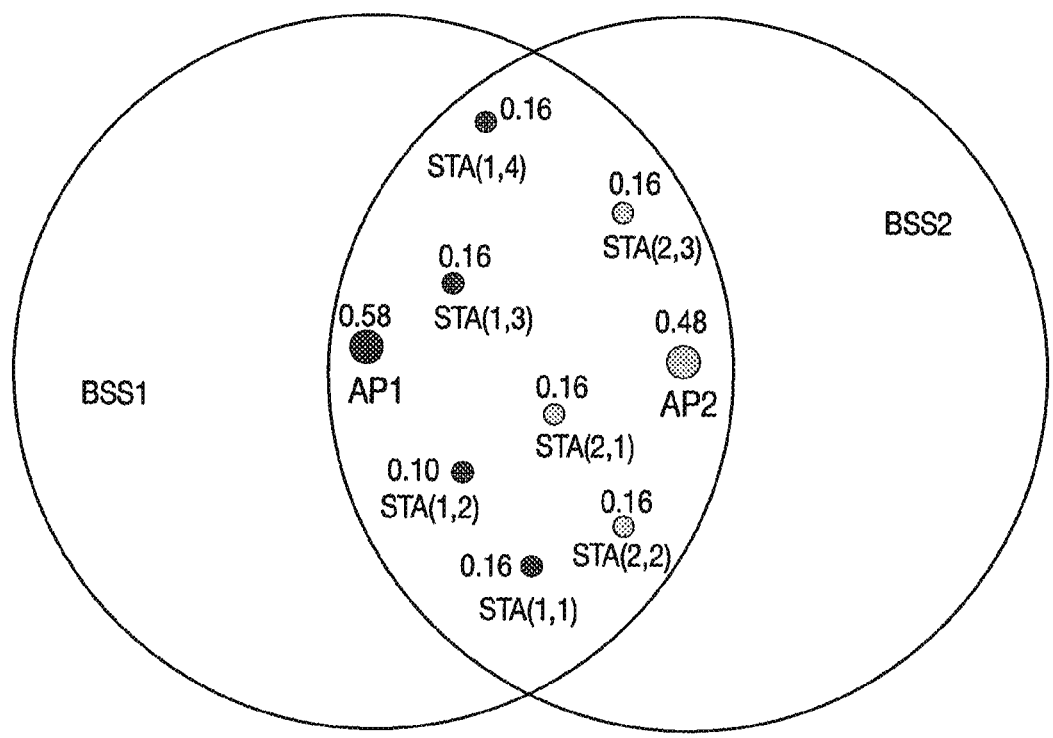
FIG. 3A shows two BSSs with the AP and all associated clients of one BSS are in the interference range of the other BSS.
Figure 3B:
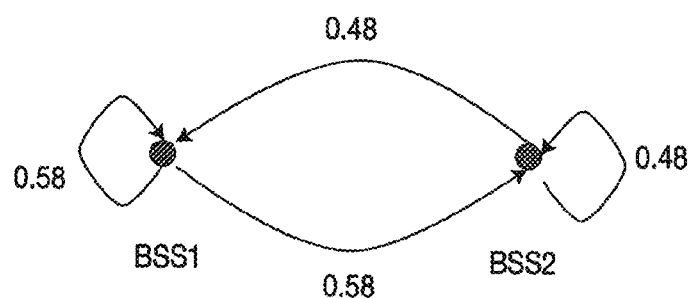
FIG. 3B is the directed weighted interference graph of the interference scenario shown in FIG. 3A.

FIG. 3A shows two BSSs where one AP and its associated clients are in the interference range of another BSS. In BSS1, AP1 has four stations associated with it. In BSS2, AP2 has three stations associated with it. The number beside each node represents the demand (channel usage) of that node. In FIG. 3A, the APs and all the clients of both BSSs are in the interference range of each other. The directed graph in FIG. 3B is used to model this scenario. In FIG. 3B, the arc from BSS2 to BSS1 indicates that BSS1 is in the interference range of BSS2, the weight associated with the arc indicates the fraction of time the interference will occur. In this case, it is the total load of BSS2. Similarly, there is an arc from BSS1 to BSS2. The weight associated with the arc is the total load of BSS1. The load of BSS1 is the sum of the demands of all its associated clients, which is represented by a directed weighted circle to the node itself as shown in FIG. 3B. In this scenario, the weight associated with the arc from node k to node j is thus given by $$w_{kj}=\mu_k \quad (2)$$

Figure 4A:
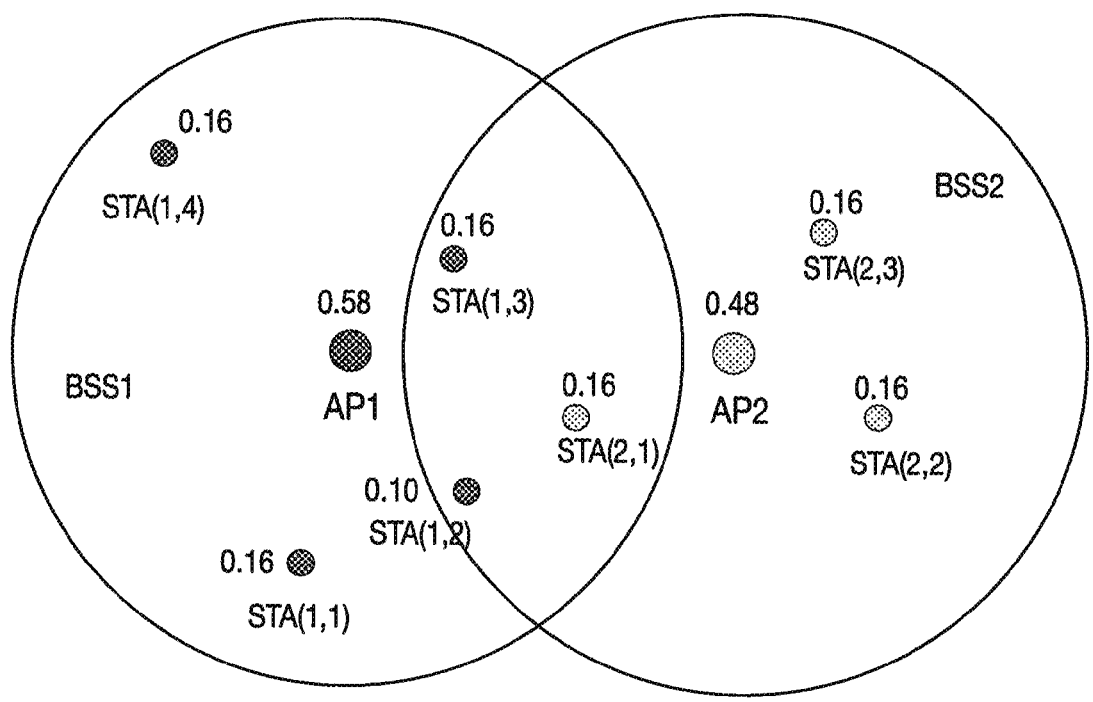
FIG. 4A depicts the hidden terminal problem.
Figure 4B:
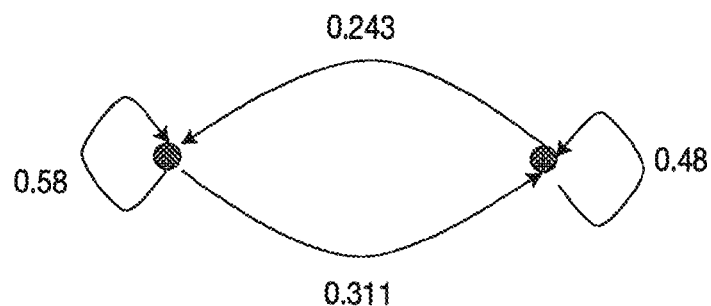
FIG. 4B is the directed weighted interference graph of the interference scenario shown in FIG. 4A.

FIG. 4A depicts another scenario. If the two BSSs are assigned to the same channel, STA (1,2), STA (1,3) from BSS1 and STA(2,1) from BSS2 will experience hidden terminal problems. Assuming RTS/CTS signaling is activated for both BSSs, when AP1 sends/transmits signals/messages to STA (1,2) or STA (1,3), even though AP2 cannot hear/receive the RTS signal/message/frame sent/transmitted by AP1, it can hear/receive the CTS signal/message/frame sent/transmitted by STA (1,2) or STA (1,3), so AP2 will refrain from any transmission. On the other hand, if AP1 sends/transmits signals/messages/frames to STA (1,1) or STA (1,4), because AP2 cannot hear the RTS signal/message/frame or the CTS signal/message/frame, AP2 can concurrently transmit/send signals/messages/frames to STA (2,2) and/or STA (2,3). The time fraction amount when AP2 cannot send/transmit includes the following two components: 1) when AP1 sends to STA (1,2) and/or STA (1,3), AP2 cannot send/transmit to any of its clients 2) when AP1 sends/transmits to STA (1,1) and/or STA (1,4), AP2 cannot send/transmit to STA (2,1). The total time fraction that AP2 cannot send/transmit because of AP1's interference is: 0.10+0.16+(0.16+0.16)*0.16=0.31. Using the same method to calculate the time fraction that AP1 cannot send/transmit because of AP2's interference is 0.16+(0.16+0.16)*(0.10+0.16)=0.243. The directed weighted interference graph modeling this scenario is shown in FIG. 4b.

Assuming that BSS k is an interfering neighbor of BSS j that causes the hidden terminal problem, there will be a directed arc that starts from node k and ends at node j. It is necessary to calculate the weight of this arc $w_{kj}$. Assuming the total load on BSS k and j are $\mu_k$ and $\mu_j$ respectively, let $\mu_{kj}(1)$ be the sum load of clients of BSS k that are in the interference range of BSS j and let $\mu_{kj}(0)$ be the sum load of clients of BSS k that are not in the interference range of BSS j then the weight of arc $w_{kj}$ is given by $$w_{kj}=\mu_{kj}(1)+\mu_{kj}(0)\mu_{jk}(1) \quad (3)$$

Figure 5A:
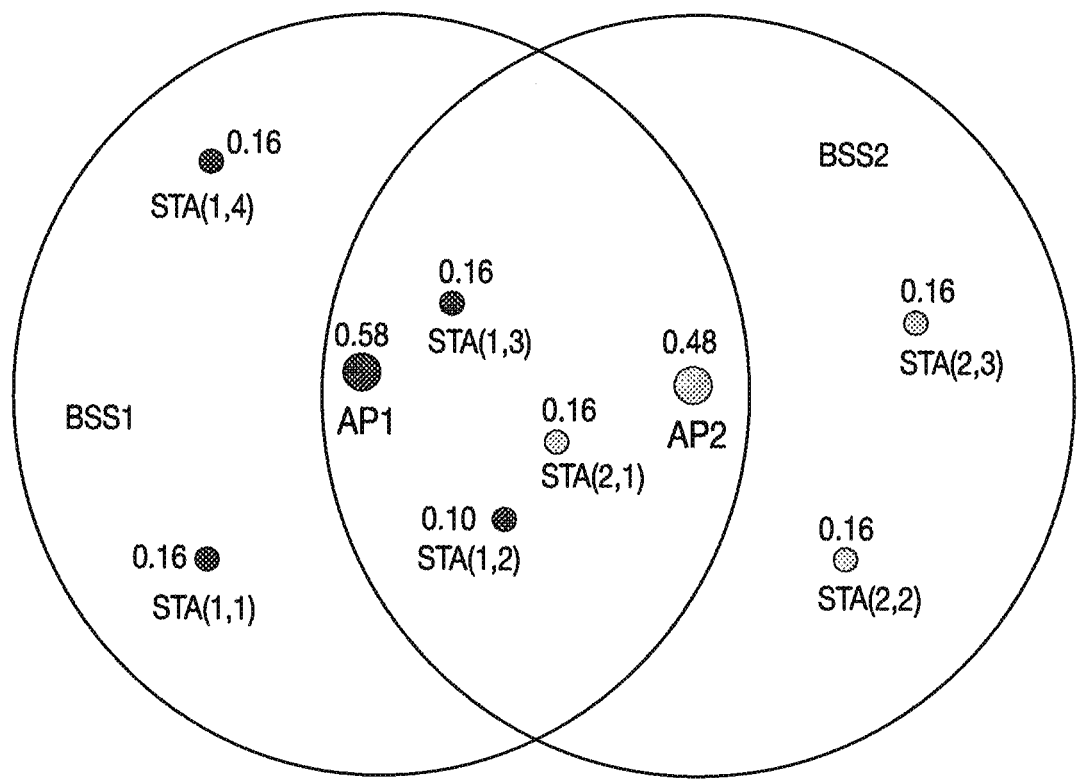
FIG. 5A depicts the exposed terminal problem.
Figure 5B:
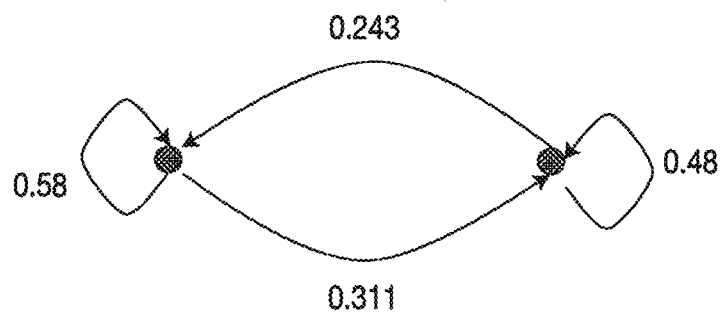
FIG. 5B is the directed weighted interference graph of the interference scenario shown in FIG. 5A.

FIG. 5A depicts the exposed terminal problem. In FIG. 5A, STA (1,1) and STA (1,4) of BSS1 and STA (2,2) and STA (2,3) of BSS2 are exposed terminals. Assuming RTS/CTS signaling is activated in both BSSs, when AP1 sends/transmits to STA (1,2) and/or SAT (1,3), AP2 will hear/receive the RTS signal/message/frame from AP1 and the CTS signal/message/frame from STA (1,2) and/or STA (1,3), so AP2 will refrain from sending/transmitting to any of its associated clients. When AP1 sends/transmits signals/message/frames to STA (1,1) and/or STA(1,4), AP2 can hear/receive the RTS signal/message/frame from AP1 but it cannot hear the CTS signal/message/frame from SAT (1,1) and/or STA (1,4). AP2 knows that it is an exposed terminal/device and can send/transmit concurrently to clients that are not in the interference range of AP1, but AP2 will refrain from sending/transmitting to STA (2,1) which is in the interference range of AP1 when AP1 is transmitting. Using the same method as described above in the hidden terminal scenario, the time fraction of interference experienced by AP1 and AP2 can be calculated with the results shown in FIG. 5B. In this case it is the same as shown in FIG. 4B.

If BSS k is an interfering neighbor of BSS j that causes an exposed terminal problem, there will be a directed arc that starts from node k and ends at node j, the value of the weight of the arc $w_{kj}$ is calculated in the same way using equation (3) above.

It should be noted that for equation (3), the neighboring APs know that there are the hidden or exposed nodes and operate to avoid a hidden and/or exposed terminal problem and, at the same time, operate to maximize the channel usage. For the current IEEE 802.11 MAC layer protocols, however, this feature is not implemented. When using the present invention under current IEEE 802.11 MAC layer protocols, when two neighboring BSS interfere with each other, equation (2) is used to calculate the interference between these neighboring APs. If hidden or exposed terminal problems are discovered, RTS and CTS signaling would be activated in the neighboring APs.

Figure 6A:
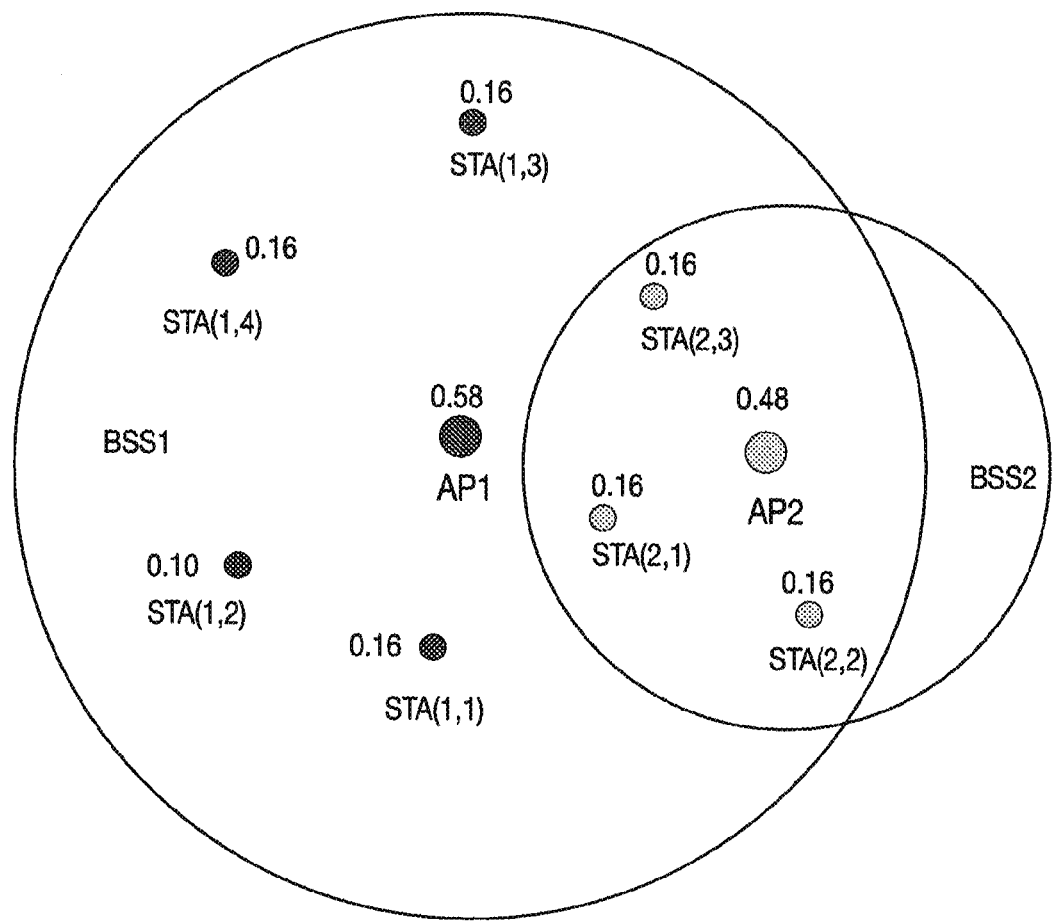
FIG. 6A depicts an interference scenario where there is asymmetric interference.
Figure 6B:
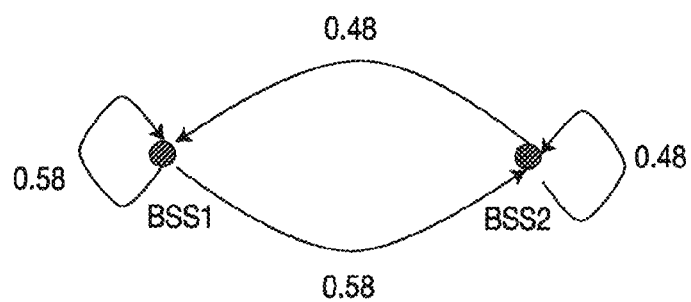
FIG. 6B is the directed weighted interference graph of the interference scenario shown in FIG. 6A.

FIG. 6A depicts a scenario in which the interference is asymmetric. In FIG. 6A, AP1 has a larger interference range than AP2. AP2 and all of its associated clients are within the interference range of AP1, but AP1 and all of its clients are outside of the interference range of AP2. When computing the interference from AP1 to AP2 ($w_{12}$), as AP2 and all of its clients are within the interference range of AP1, equation (2) is used. On the other hand, when computing the interference from AP2 to AP1, because all the clients in AP2 are hidden from AP1, equation (3) is used. FIG. 6B shows the directed weighted interference graph for this scenario. In this case, there is no way for AP1 or its associated clients to detect that AP2 or its associated clients are hidden terminals. Only the centralized server, that has all the knowledge of the topology, will know that this scenario has occurred. Also activation of RTS/CTS signaling in AP2 will not solve the problem. Another coordinative scheduling method is needed to avoid collisions between the transmissions of AP1 and AP2. Using existing IEEE 802.11 MAC layer protocols, the centralized server needs to notify AP2 and its associated clients to pump up the transmission power of RTS/CTS messages/frames/signals until AP1 can is able to hear/detect/receive the signals.

Figure 7A:
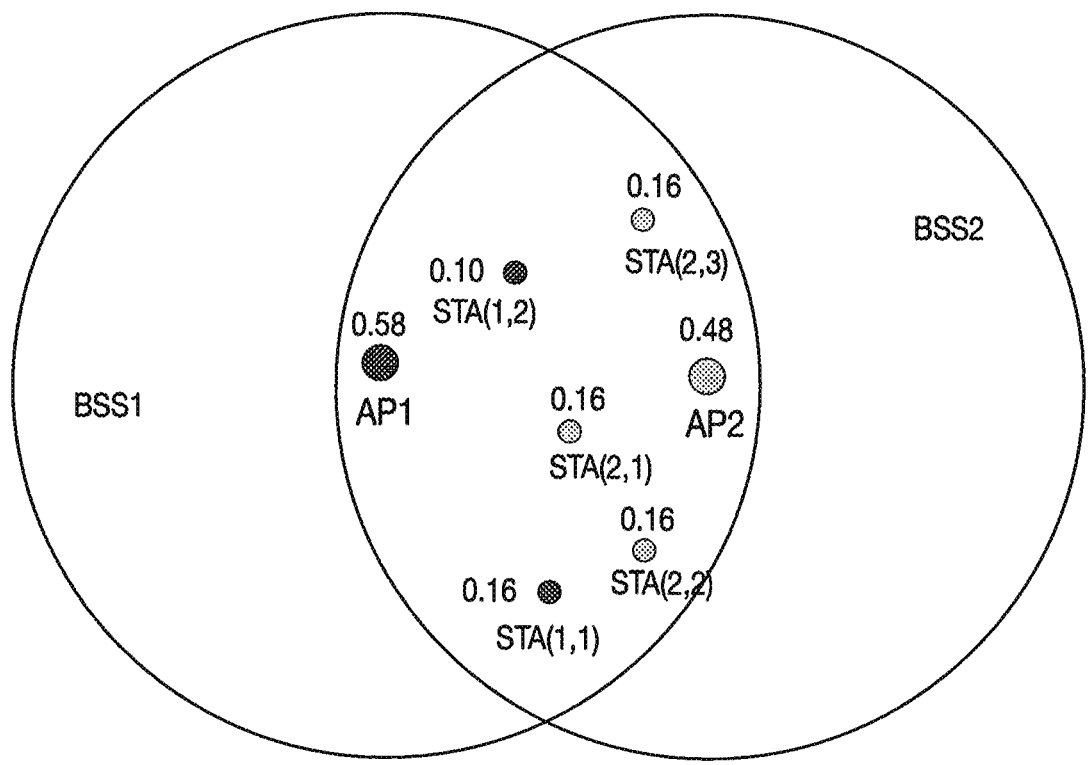
FIG. 7A depicts an interference scenario between a cooperative BSS and a non-cooperative BSS.
Figure 7B:
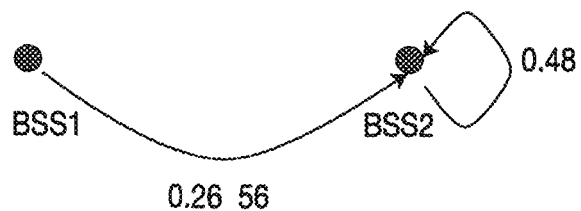
FIG. 7B is the directed weighted interference graph of the interference scenario shown in FIG. 7A.

FIG. 7A depicts a scenario where BSS1 is a non-cooperative BSS but BSS2 is a cooperative BSS. In this case, the amount and on which channel BSS1 will interfere with BSS2 needs to be indicated. As shown on FIG. 7B, the amount of the interference is 0.26, and the channel of the interference is 56. For a non-cooperative BSS, there is no need to be concerned about how much interference it experiences, so there are no incoming arcs that end at the non-cooperative BSS node. When a non-cooperative BSS shares the bandwidth with a cooperative BSS, the interference of a non-cooperative BSS to a cooperative BSS is calculated using the methods described above depending on the interference scenario.

To build the directed weighted interference graph, each AP and all its associated clients scan all the channels periodically. The clients report their scan results to their AP and the AP reports all the scan results to a centralized server If the AP and all of its clients have heard the other AP, then this BSS is in the interference range of the other AP.

If the AP did not hear the other AP, but one or more of its clients heard the AP, then these associated clients are in the interference range of the other AP, and are hidden terminals.

If the AP heard the other AP, but one or more of its associated clients did not hear the AP, then these associated clients are exposed terminals.

If the AP and all of its clients did not hear the other AP, but the other AP or one or more of its clients can hear the AP, then the centralized server will know that the other AP or the clients are hidden terminals of the AP.

The centralized server receives all the scan results of the APs and their associated clients. The AP also reports the demand of each of its associated clients to the centralized server. For non-cooperative BSSs, their cooperative neighbors will report their load back to the centralized server, the load can be estimated based on the average fraction of channel busy time that the AP in the non-cooperative BSS consumes/uses. Each cooperative AP will keep a list of its interference APs and the corresponding hidden terminals and exposed terminals. The centralized server will build the directed weighted interference graph using the methods described above.

2. Optimized Centralized Solution

Assuming the directed weighted interference graph G(V, A) has been built for a wireless network, where V is the set of nodes that represent the BSSs and further assuming that N is the set of nodes that represent cooperative BSSs and N' is the set of nodes that represent non-cooperative BSSs, then V=N∪N'. An arc in A can be represented by a ordered pair of nodes (k, j), where k, j∈V. It is important to note that arc (k, j) is different from arc (j,k). A directed circle from node k to itself is represented by (k, k). Each arc (k, j) has a weight $w_{kj}$ associated with it. The weight on a directed circle for node k to itself is represented by $w_{kk}$. An indication function is defined as follows:

$$c_{ij} = \begin{cases} 1 & \text{channel } i \text{ is assigned to } BSS \ j \\ 0 & \text{otherwise} \end{cases} \quad (4)$$

Assuming there are a total of M channels, if channel i, $1 \leq i \leq M$, is assigned to node j, $j \in N$ the total load of this BSS and its neighboring BSSs that are communicating over this channel must be less than one. This constraint can be represented by the following function:

$$\sum_{(k,j) \in A} c_{ik} w_{kj} \leq 1, \ \forall j \in N, \forall k \in V \quad (5)$$

Note that if node k is a non-cooperative BSS (that is $k \in N'$), then $c_{ik}$ is known before hand, and is not a variable. The load of the node j itself is added to the summation on the left side of equation (5) when k=j, in this case, $w_{jj}$ is the weight of directed circle that starts and ends at node j.

Figure 8:
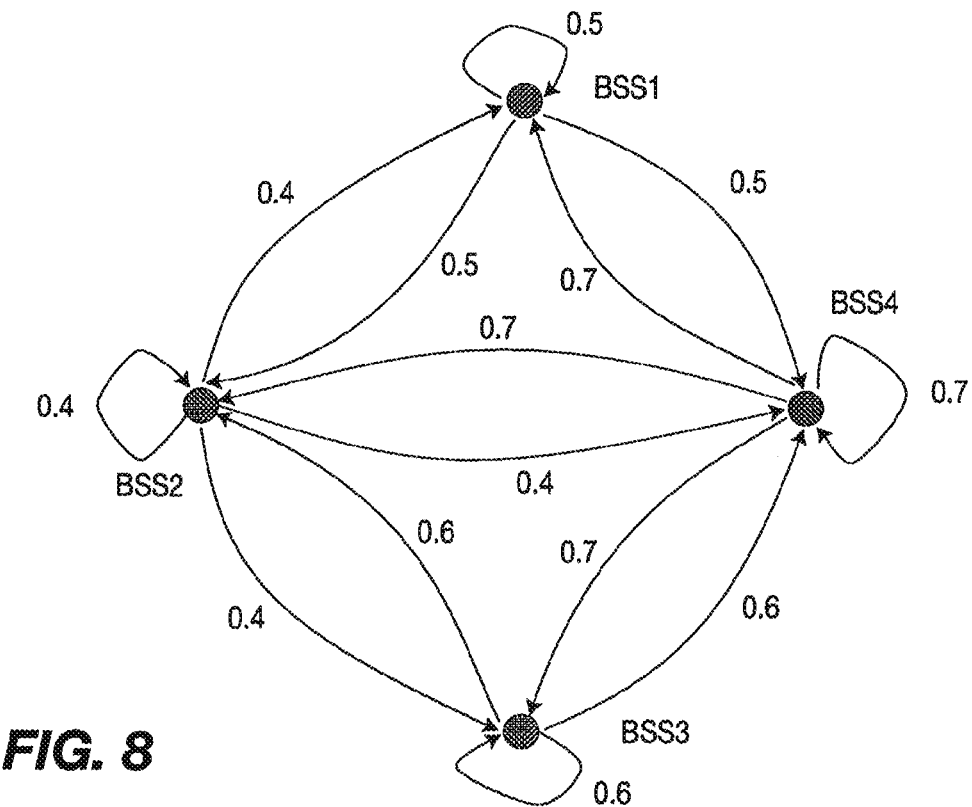
FIG. 8 is a directed weighted interference graph with four nodes.

Equation (5) must be satisfied only when channel i is assigned to node j. If channel i is not assigned to node j, node j does not have to satisfy this equation. In fact, if node j is required to satisfy equation (5) for all channels, no matter if that channel is assigned to node j or not, it would limit the channel reuse significantly. For example, FIG. 8 shows the interference graph of 4 nodes. If equation (5) has to be satisfied for every channel at BSS2, then the same channel cannot be assigned to BSS1 and BSS3. This is not the case, as BSS1 and BSS3 do not interfere with each other, so equation (5) cannot be used as a constraint to a channel assignment optimization problem.

To circumvent this situation, consider the following constraint equation:

$$\sum_{(k,j) \in A} (c_{ij} + c_{ik} - 1) w_{kj} \leq 1, \ \forall j \in N, \forall k \in V, 1 \leq i \leq M \quad (6)$$

Note that when channel i is assigned to node j, $c_{ij}=1$ and equation (6) and equation (5) are equal. When channel i is not assigned to node j, $c_{ij}=0$ (so $c_{ij}+c_{ik}-1 \leq 0$), equation (6) will always be satisfied.

Given the demand of each BSS, the directed weighted interference graph G(V, A) can be built and the weights on each arc in the interference graph can be calculated. The goal of the channel assignment method of the present invention is to find $c_{ij}$, $j \in N$, so that the demand (channel usage) of each BSS will be satisfied. Note that for $j \in N'$, $c_{ij}$ is known before hand and is not a binary variable. To find a feasible solution for channel assignment, the following optimization problem is formed:

$$\text{Minimize } \sum_{i=1}^{M} \sum_{j=1}^{N} s_{ij} \quad (7)$$

Subject to: $\sum_{(k,j) \in A} (c_{ij} + c_{ik} - 1) w_{kj} \leq 1 + s_{ij}$, (8)

$\forall j \in N, \forall k \in V, 1 \leq i \leq M$ and:

$$\sum_{i=1}^{M} c_{ij} \geq 1, \ \forall j \in N, 1 \leq i \leq M \quad (9)$$

$s_{ij} \geq 0, \ \forall j \in N, 1 \leq i \leq M$ (10)

Note that $s_{ij}$ is the indication of infeasibility (lack of feasibility). If $s_{ij}=0$, for all i and j, this means a feasible solution has been found. Otherwise, a least infeasible solution is found. After the method has been completed, each node should check if any of its neighboring BSSs, that have been assigned the same channel as itself, are on the list of BSSs that cause hidden or exposed terminal problems. If there are, this BSS need to activate RTS/CTS signaling.

The above formulation of the problem is trying to find a feasible solution. There is no consideration of fairness among the different BSSs when assigning the channels. Also when there is sufficient bandwidth resource, channels are assigned to maximize the bandwidth margin so that when additional load is added, the current channel assignment remains feasible.

To achieve this, the following optimization problem is formulated:

Minimize $\varepsilon$ (11)

Subject to: $\varepsilon \sum_{(k,j) \in A} (c_{ij} + c_{ik} - 1) w_{kj} \leq 1$, (12)

$\forall j \in N, \forall k \in V, 1 \leq i \leq M$ and:

$$\sum_{i=1}^{M} c_{ij} \geq 1, \ \forall j \in N, 1 \leq i \leq M \quad (13)$$

$\varepsilon > 0$ (14)

If the problem is solved such that $\varepsilon \geq 1$, then a feasible solution has been found. Because $\varepsilon$ is a maximum, the minimum bandwidth margin for each BSSs has been maximized. On the other hand, if $\varepsilon < 1$, means no feasible solution has been found. Each BSS then decreases its load by a ratio of $1-\varepsilon$ to make channel assignment feasible.

Equations (11) to (14) define a nonlinear integer programming problem, which is very difficult to solve, to make the problem linear, define $\eta = 1/\varepsilon$, and the problem definition becomes:

Minimize $\eta$ (15)

Subject to: $\sum_{(k,j) \in A} (c_{ij} + c_{ik} - 1) w_{kj} \leq \eta$, (16)

$\forall j \in N, \forall k \in V, 1 \leq i \leq M$ and:

$$\sum_{i=1}^{M} c_{ij} \geq 1, \ \forall j \in N, 1 \leq i \leq M \quad (17)$$

$\eta > 0$ (18)

If the problem is solved such that $\eta \le 1$, a feasible solution has been found, otherwise the least infeasible solution is found. This problem is trying to minimize the maximum channel usage of an interference region, the maximum the bandwidth margin and fairness among the BSSs is embedded in the problem definition.

The optimization problem defined above is a mixed integer programming problem, which can be solved by commercially available optimization tools such as CPLEX.

Figure 9A:
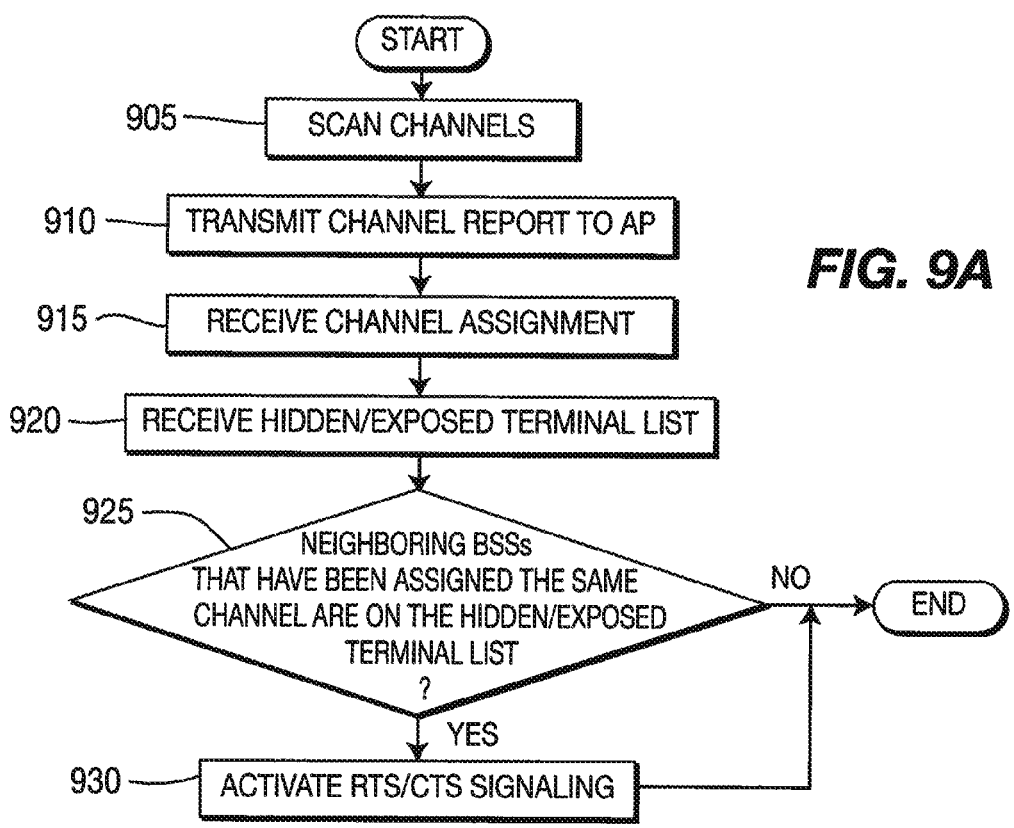
FIG. 9A is a flowchart of the optimized centralized channel selection/assignment method of the present invention from the perspective of the client.

FIG. 9A is a flowchart of the optimized centralized channel selection/assignment method of the present invention from the perspective of the client. At 905 the client scans the channels. The client then transmits the results of its scan in a report to the AP with which it is associated at 910. At 915 the client receives channel assignments (its own channel assignment and any other channel assignments of its neighbors that it may need). At 920 the client receives the hidden and exposed terminal lists. A test is performed at 925 to determine if the neighboring BSSs that have been assigned the same channel are on the hidden and exposed terminal lists. If the neighboring BSSs that have been assigned the same channel are on the hidden and exposed terminal lists then the client activates RTS/CS signaling at 930. If the neighboring BSSs that have been assigned the same channel are not on the hidden and exposed terminal lists then processing ends.

Figure 9B:
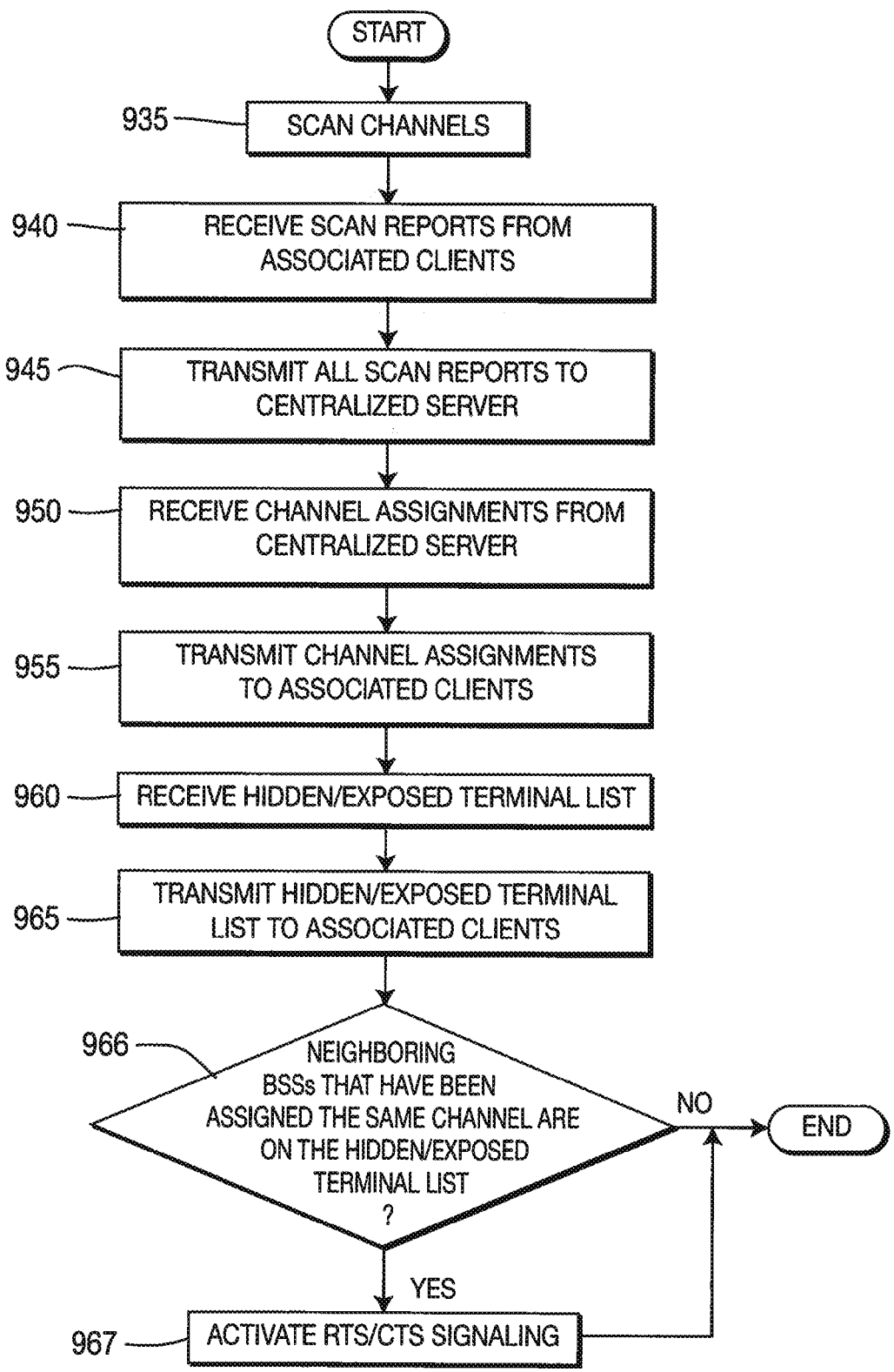
FIG. 9B is a flowchart of the optimized centralized channel selection/assignment method of the present invention from the perspective of the AP.

FIG. 9B is a flowchart of the optimized centralized channel selection/assignment method of the present invention from the perspective of the AP. At 935 the AP scans channels. The AP receives channel scan reports from its associated clients at 940. The AP transmits its channel scan report and the channel scan reports of its associated clients to the centralized server at 945. It should be noted that the access point may combine its channel report and the channel reports of its associated clients to create/generate a single channel report to send/transmit to the server. At 950 the AP receives the channel assignments from the centralized server. The AP then transmits the channel assignments (in a message) to its associated clients at 955. At 960 the AP receives the hidden and exposed terminal lists from the centralized server and at 965 the AP transmits the hidden and exposed terminal lists to its associated clients. A test is performed at 966 to determine if the neighboring BSSs that have been assigned the same channel are on the hidden and exposed terminal lists. If the neighboring BSSs that have been assigned the same channel are on the hidden and exposed terminal lists then the client activates RTS/CS signaling at 967.

Figure 9C:
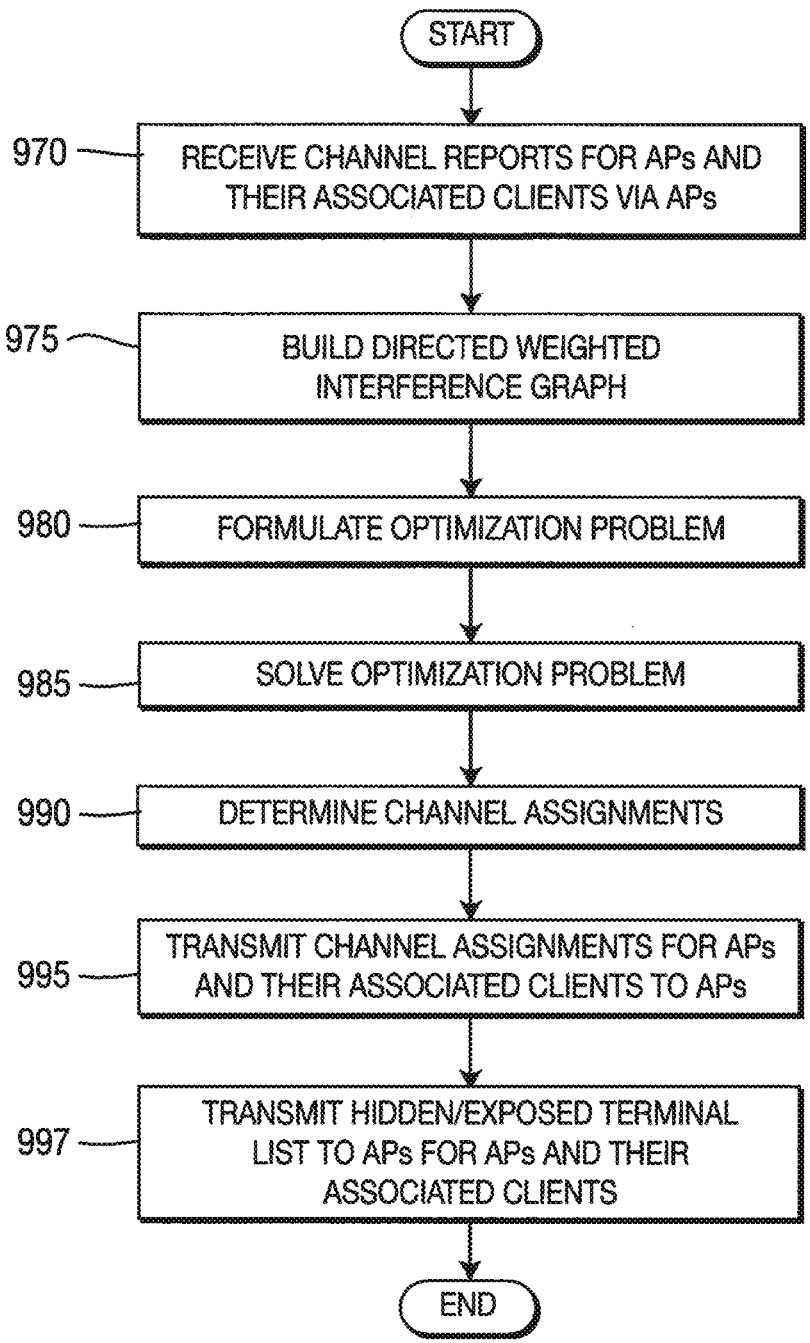
FIG. 9C is a flowchart of the optimized centralized channel selection/assignment method of the present invention from the perspective of the centralized server.

FIG. 9C is a flowchart of the optimized centralized channel selection/assignment method of the present invention from the perspective of the centralized server. At 970 the centralized server receives channel scan reports for the APs in the BSS. The channel scan reports are from the APS and their associated clients. At 975 the centralized server builds the directed weighted edge interference graph and at 980 the centralized server formulates the optimization problem. At 985 the centralized server solves the optimization problem and determines the channels assignments based on the results of the optimization problem solution at 990. At 995 the centralized server transmits the channel assignments (in a message) for the APs and their associated clients to the APs in the BSS. At 997 the centralized server transmits the hidden and exposed terminal lists to the APs.

Figure 9D:
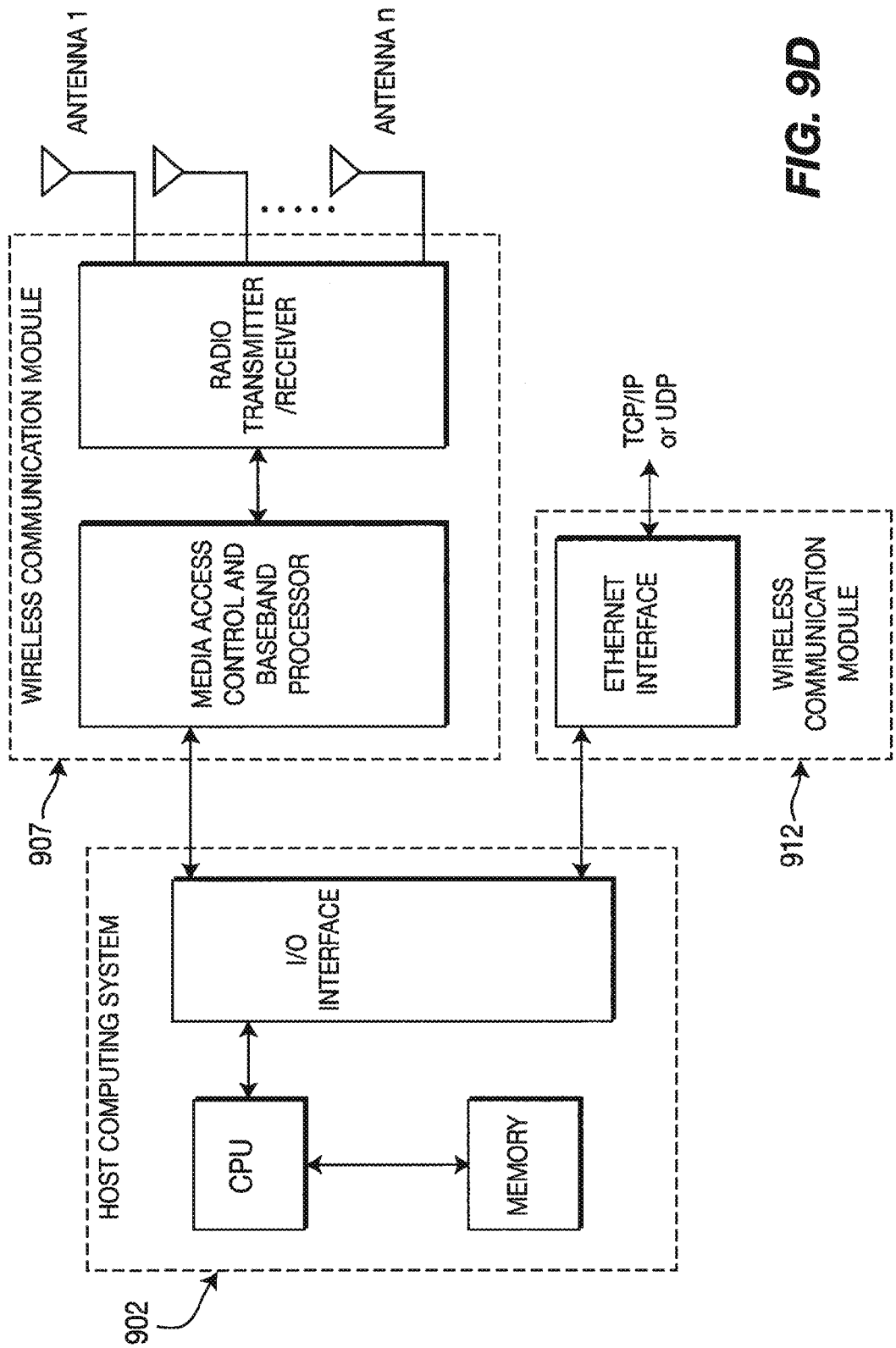
FIG. 9D is a block diagram of an exemplary embodiment of the present invention from the perspective of an AP or a STA.

FIG. 9D is a block diagram of an exemplary implementation of the present invention for a STA and/or an AP. As a STA and/or an AP can be a transmitter, a receiver or a transceiver, a single block diagram is used to describe these devices. Each device includes a host computing system (902), a wireless communication module (907) and a wired communication module (912). The host processing system can be a general-purpose computer or a specific-purpose computing system. The host computing system can include a central processing unit (CPU), a memory and an input/output (I/O) interface. The wireless communication module can include a MAC and baseband processor, radio transmitter/receiver, and one or more antennas. An antenna transmits and receives the radio signals. The radio transmitter/receiver performs radio signal processing. The radio transmitter/receiver may be a transceiver or a separate transmitter and receiver. The MAC and baseband processor performs MAC control and data framing, modulation/demodulation, coding/decoding for the transmission/receiving. The wired communication module can be an Ethernet interface communicating with other devices using TCP/IP or UDP protocol. Usually an AP and a STA communicate with each other through a wireless channel, an AP and the centralized server can communicate using wired and/or wireless interface. A STA can communicate with other devices such as computer or TV using wired interface. For a STA, functionalities of channel scanning, transmitting the channel scan report to its associated AP, receiving channel assignment and hidden and exposed nodes/terminals list from its associated AP, and activating RTS/CTS signaling are performed by the wireless communication module. For an AP, functionalities of channel scanning, receiving channel scan reports from associated STAs and transmitting channel assignment and hidden and exposed nodes/terminals list to STA are performed by the wireless communication module; transmitting channel scan reports to the centralized server, receiving channel assignment and hidden and exposed nodes list from the centralized server can be performed by either wireless communication module or wired communication module.

Figure 9E:
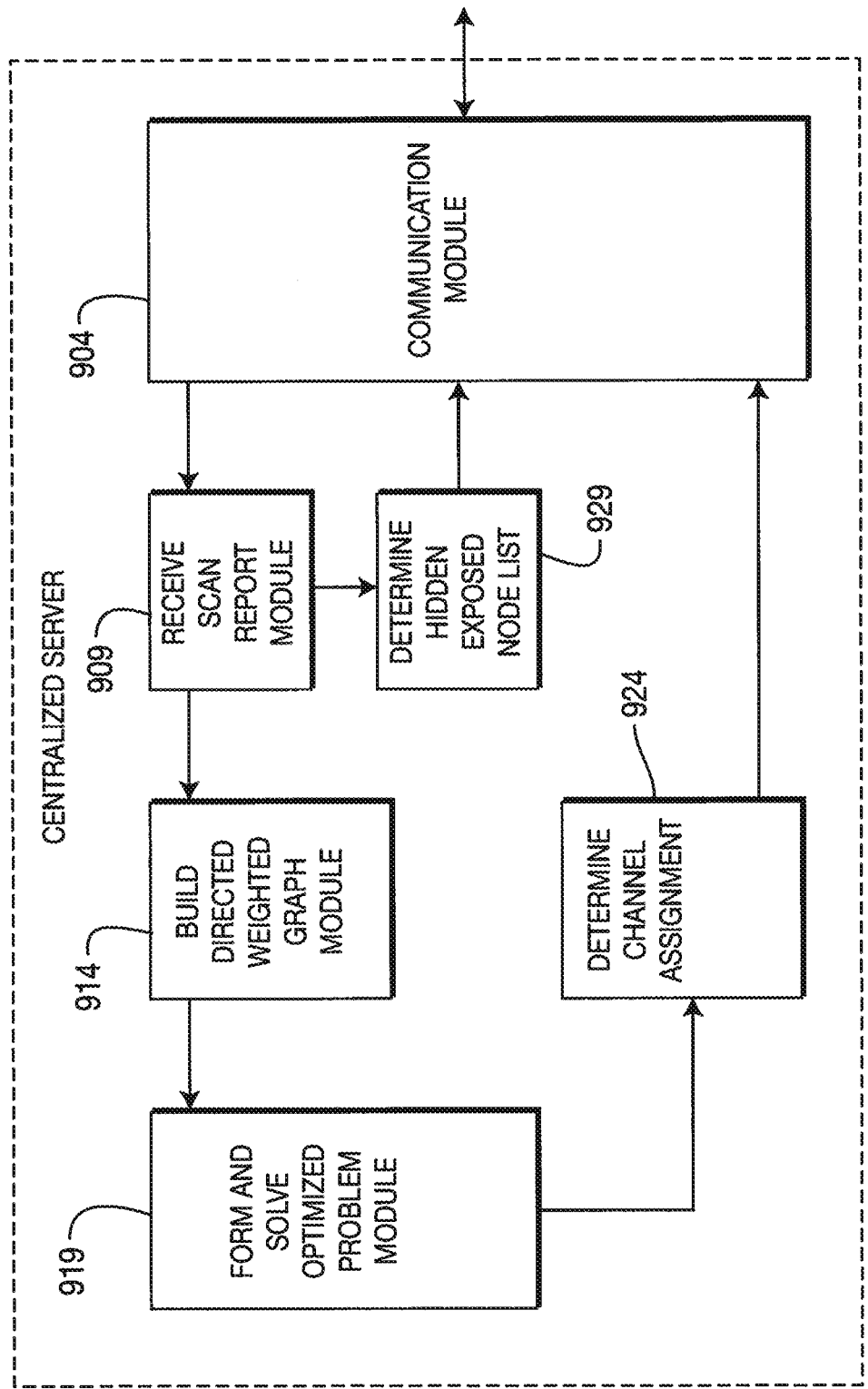
FIG. 9E is a block diagram of an exemplary embodiment of the present invention from the perspective of the centralized server for optimized channel selection/assignment method.

FIG. 9E is a block diagram of an exemplary implementation of the present invention from the perspective of a centralized server for optimized channel selection/assignment method. The centralized server includes a communication module (904), a module for receiving scan report from APs (909), a module to build directed weighted interference graph (914), a module to form and solve the optimized problem (919), a module to determine the channel assignment (924) and a module to determine the hidden and exposed node/terminal list (929).

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device.

3. Heuristic Centralized Solution

The optimization method defined above is NP-hard, it does not scale well as the number of nodes in the network increases. Also the algorithm may be running on a set top box, which does not have very high computational power. The memory on the set top box may also be limited. These factors will further impact the performance of the optimized solution. It is desirable to have a simpler method that may provide a sub-optimal (but workable/viable) solution.

Again, assume that the directed weighted interference graph has been built. A heuristic algorithm would first sort the nodes in the interference graph into an ordered list, and then assign one channel to each node sequentially following that order. There are many ways to decide the order of the nodes. One way is to sort the nodes according to their degree. In a directed graph, the node's degree can be its in-degree, which are the number of arcs that end at this node or out-degree, which are the number of arcs that start from this node or both, which is the sum of the in-degree and out-degree. Another way is to sort the nodes according to their load. In the following example the nodes are sorted according to their accumulated load but could be sorted in any manner as indicated above. Herein the accumulated load of a node is the sum of the load of itself and the amount of interference that its neighboring nodes have on this node. The accumulated load of node j is, therefore, defined as:

$$\lambda_j = \sum_{(k,j) \in A} w_{kj} \quad (19)$$

The nodes in the interference graph are sorted according to $\lambda_j$ in a decreasing order. That is, the node with the highest $\lambda$ value will be selected to assign a channel first, and so on. The sorting order may also be an increasing order.

Defining $\phi(i, j)$ to be the sum load of node j and its neighboring nodes that use channel i if channel i is to be assigned to node j, $$\varphi(i, j) = \sum_{(k,j) \in A} c_{ik} w_{kj} \quad (20)$$

First all the feasible channels that can be assigned to node j are found/determined/located. Channel i is a feasible channel to assign to node j if $\phi(i, j) \leq 1$. Before channel i is assigned to node j, some of the neighboring nodes of node j may have already been assigned to channel i. Channel i is a feasible channel for node j if all the neighbors using channel i retain their feasibility. Define the set of neighbors that are in the interference range of node j as I (j), that is, $$I(j) = \{v : (j, v) \in A\} \quad (21)$$

So channel i is a feasible channel for node j if $\phi(i, j) \leq 1$, and $\phi(i, k) \leq 1$, $\forall k \in I(j)$.

If only one feasible channel is found/determined/located for node j, then this channel would be assigned to node j. If more than one feasible channel is found for node j, then the feasible channel that has the least $\phi(i, j)$ value is assigned to node j. If there are no feasible channels, then the channel that has the least $\phi(i, j)$ value is assigned to node j. After channel assignment has been completed, then each node checks if any of its neighboring BSSs that have been assigned the same channel as itself are on the list of BSSs that cause hidden or exposed terminal problems. If there are, this BSS needs to turn on RTS/CTS signaling.

FIG. 10A shows the flow chart of the centralized heuristic method in accordance with the principles of the present invention from the perspective of the centralized server. The flowcharts for the client and the AP for the heuristic centralized solution are the same as for the optimized centralized solution. It is a simpler method and may therefore yield a sub-optimal solution but the solution will be easier to process given the resources available. At 1005 the centralized server receives channel scan reports for the APs in the BSS. The channel scan reports are from the APS and their associated clients. At 1010 the centralized server builds the directed weighted edge interference graph and at 1015 the centralized server sorts/orders the nodes. The nodes are sorted/ordered according to their degree or accumulated load as described above. This is usually in decreasing order but may be in increasing order. Sorting/ordering may be by in-degree, out-degree, the sum of in-degree and out-degree or accumulated load. The centralized server at 1020 then selects a node from the ordered list. Usually this would be by starting at the top of a list sorted/ordered in decreasing order and continuing until all nodes have been selected (one after another). The centralized server then determines the channel assignments at 1025. The channel assignments are determined by assigning a feasible channel if a feasible channel (the channel with the lowest $\phi$ value) is available. If a feasible channel is not available then the least infeasible channel is made (the channel with the lowest $\phi$ value). At 1030 the centralized server transmits the channel assignments (in a message) for the APs and their associated clients to the APs in the BSS. At 1035 the centralized server transmits the hidden and exposed terminal lists to the APs.

FIG. 10B is a block diagram of an exemplary implementation of the present invention for a centralized server for the heuristic solution. Note that it is very similar to the centralized server for optimized solution, only module 1006, which is used to sort nodes and select nodes for channel assignment is different from the previous block diagram (FIG. 9E).

The above described one-pass heuristic algorithm can be used as the input for iterative heuristic algorithms such as genetic algorithm (GA). In the following, a GA algorithm for channel selection is described.

In a genetic algorithm, a single instance of a solution to the problem is called a genome. A function to measure how good a genome is according to the objective of the genetic algorithm is also needed. This function is called fitness function. The genetic algorithm first creates a population of solutions (genomes), the population then evolves using genetic operations such as crossover or mutation. Different genetic algorithms use different ways to manipulate the population. The 'simple genetic algorithm' uses non-overlapping populations. That is, during the evolution, for each generation, the algorithm creates an entire new population of genomes. The 'steady state genetic algorithm' uses overlapped populations. In the steady state approach, only part of the population is replaced in each generation. There are other genetic algorithms as well. Once the representation of genome and the fitness function is defined, different genetic algorithms can be used.

Assuming that the interference graph has been built as described above, the set of channels that can be used is represented by C and the number of channels that can be used is M. The channel assigned to node j is represented by:

$$c_j \in C = \{1, 2, \ldots M\} \quad (22)$$

Assuming further that there are N cooperative nodes in the interference graph. A genome in the GA algorithm is represented by a N tuple: $\{c_1, c_2, \ldots c_n\}$. Define the following indication function:

$$\psi(c_i, c_j) = \begin{cases} 1 & \text{if } c_i = c_j \\ 0 & \text{otherwise} \end{cases} \quad (23)$$

Let $I_j$ represent the set of nodes that interfere with node j plus node j itself in the interference graph, the infeasibility of node j would then be calculated as:

$$s_j = \begin{cases} \sum_{k \in I_j} \psi(c_j, c_k) w_{kj} - 1 & \text{if } \sum_{k \in I_k} \psi(c_j, c_k) w_{kj} > 1 \ \forall \ j \in N \\ 0 & \text{otherwise} \end{cases} \quad (24)$$

The total infeasibility of the network would be:

$$s = \sum_{j=1}^{N} s_j \qquad (25)$$

The fitness function of a genome is defined as:

$$f = \frac{1}{s + \alpha} \qquad (26)$$

Where $0 < \alpha \leq 1$ is a constant number to prevent the denominator from being equal to 0. Taking the number of infeasible nodes into consideration, the fitness function can be defined as:

$$f = \frac{1}{qs + \alpha} \qquad (27)$$

Where q is the number of infeasible nodes. The GA algorithm runs until $f \leq \theta$, or some other stop criteria is met, like the number of evolution generations reaches a certain threshold. Here $\theta$ is a design parameter. The maximum value of $\theta$ is $1/\alpha$.

Fitness function (26) and/or (27) is based on the objective function of the problem defined by equations (7) to (10), another way is to define the fitness function based on the objective function of the problem defined by equations (15) to (18). This has advantage of taking fairness and bandwidth margin into consideration as discussed above. For each genome, define:

$$\xi = \max_{j \in N} \left( \sum_{k \in I_j} \psi(c_j, c_k) w_{kj} \right) \qquad (28)$$

The fitness function of the genome can then be defined as:

$$f = \frac{1}{\xi + \alpha} \qquad (29)$$

where $\alpha$ is the same as described in equation (26).

As described above, after the genome representation and the fitness function are defined, various genetic algorithms to find the solution of the problem can be used. Herein the steady state genetic algorithm is used as an example.

For steady state genetic algorithm, the following parameter set is used:
  Number of populations for each generation
  Probability a genome is selected for crossover
  Probability a genome is selected for mutation
  The percentage of replacement for each generation
  The maximum number of generations the algorithm would evolve before stopping An appropriate initialization method facilitates the convergence of the genetic algorithm. The initialization method creates the first generation of the population. The result from the one-pass heuristic algorithm described above can be added as one genome to the first generation of population. Other instances of genomes in the first generation population can be initialized randomly. That is, each node selects a channel randomly from the set of available channels, or initialized from the results from other heuristic algorithms.

For each step of the evolution of the genetic algorithm, a new generation of population is created through genetic operations such as crossover and mutation. For crossover operation, two genomes are selected to exchange part of their genomes at a randomly selected point. Two offspring are created. Often genomes that have better fitness have a higher probability to be selected for crossover. For mutation operations, a genome has some of their genes flipped to create a new genome. Each genome has a low probability to be selected for mutation operation. For the steady state genetic algorithm, certain percentage of the population is replaced by the newly created genomes. A genome that has a better fitness has a higher probability to be selected into the next generation. When the genetic algorithm stops, the genome that has the best fitness is selected as the solution.

Figure 11B:
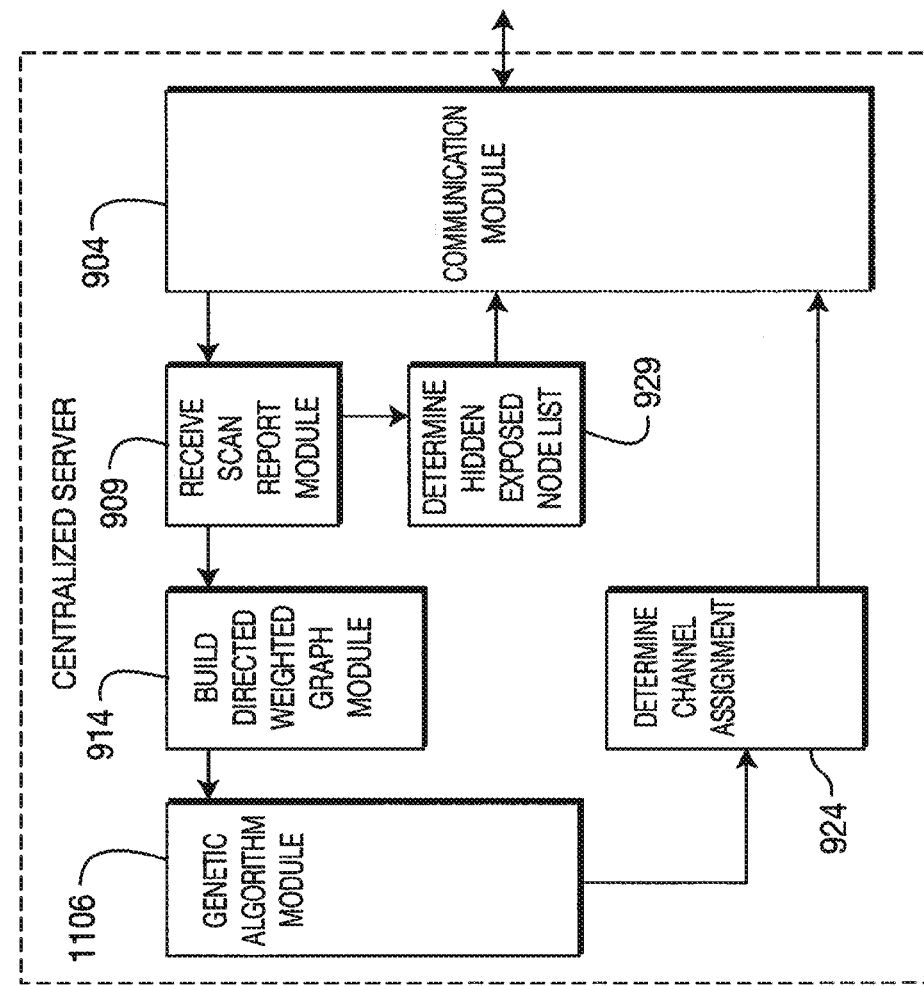
FIG. 11B is a block diagram of an exemplary embodiment of the present invention from the perspective of the centralized server for genetic channel selection/assignment method.
Figure 11A:
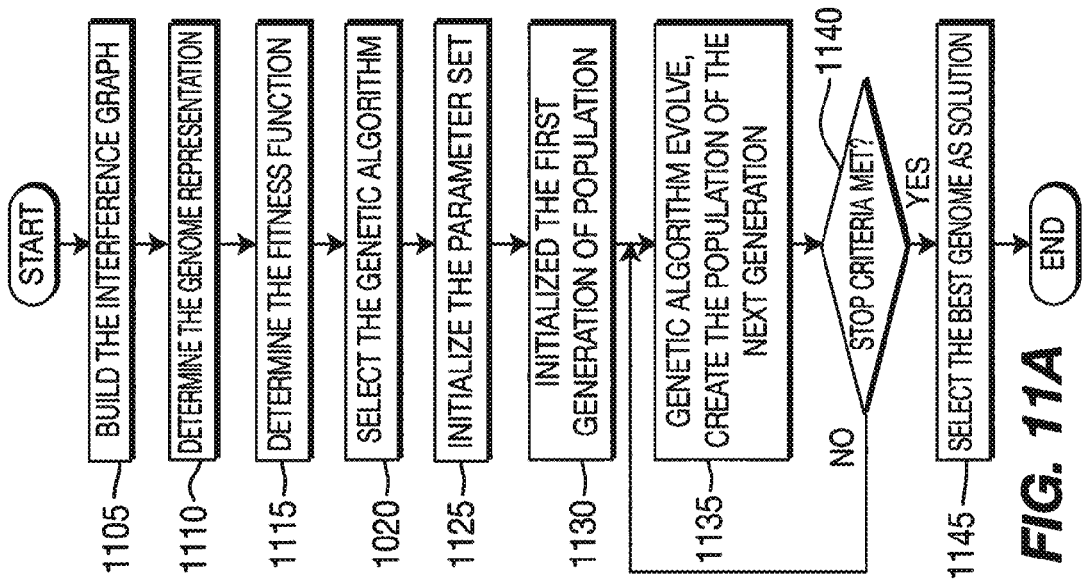
FIG. 11A is a flowchart for the genetic method of the present invention.

FIG. 11A shows the flow chart of using steady state genetic algorithm for channel selection. At 1105 the centralized server builds the interference graph. The genome representation is determined at 1110. The fitness function is determined at 1115. A genetic algorithm is selected at 1120. The parameter set is specified/initialized at 1125 and the first generation of the population is initialized at 1130. The genetic algorithm is iterative and at 1135 the iterative process is performed with subsequent populations generated using, for example, crossover and mutation as described above. A test is performed at 1140 to determine if the threshold (based on the fitness function) has been met such that the genetic algorithm stops. If the threshold has not been met then the algorithm continues at 1135. If the threshold has been met then at 1145 a best solution is selected from among the possible genome populations. As stated above, in the genetic method, an instance of a solution is represented by a genome. When the genetic method stops, a genome that has the best fitness is selected, which means the best solution has been selected. In the case of the present invention that means the channel assignments.

FIG. 11B is a block diagram of an exemplary implementation of the present invention for a genetic algorithm. Note that it is very similar to the centralized server for optimized solution, only genetic algorithm module 1106, which is used to determine genome representation and fitness function, initialized and evolve the population, etc., is different from the previous block diagrams (FIGS. 9E and 10B).

4. Dynamic Channel Assignment Using Centralized Algorithm

The above described channel selection algorithm can be used at the stage of network planning, for one time static channel assignment or executed at a centralized server periodically for dynamic channel assignment. When used for dynamic channel assignment, there is a stability issue. When a minor change in the topology or load distribution occurs, if the entire interference graph is rebuilt and the algorithm is re-executed on the whole topology, a new feasible solution may be found/determined but most of the nodes may have to switch to new channels. If the intervals between the consecutive runs of the algorithms are short, APs and clients may spend a lot of time on channel switching, which may cause a great deal lot of overhead. A method to circumvent this problem is now described.

There are many events that may trigger changes in the interference graph. Some events, such as load decreases, a BSS shutting down or moving away, will not affect the feasibility of the previous channel assignment. Other events, such as when a new cooperative or non-cooperative BSS appears, a jump in load or transmission power at some BSSes, may cause the previous channel assignment to become infeasible. In this case, instead of rebuilding the whole interference graph and re-executing the channel selection algorithm on the whole topology, subgraphs can be built that include the infeasible node or nodes from the original graph and the algorithm can be executed using the subgraphs. This way, only nodes in the subgraphs may switch to newly assigned channels, other nodes will continue work on their originally assigned channel. Cooperative nodes not in the subgraph but which are neighbors of nodes in the subgraph becomes non-cooperative nodes when the interference graph of the subgraph is built. Non-cooperative neighbors of the subgraph nodes remain as non-cooperative nodes when the interference graph of the subgraph is built.

It should be noted that a subgraph may include one or more infeasible nodes. In some cases, if the infeasible nodes are separated by multihops, with feasible nodes in between, multiple small subgraphs may be created; each includes a subset of the infeasible nodes that are one-hop or two-hop neighbors.

In order to keep the number of nodes in the subgraph as small as possible, but still find a feasible solution of the subgraph, nodes should be added into the subgraph gradually. Initially, a subgraph should contain only infeasible nodes with all interfering neighbors assumed to be non-cooperative nodes. If no feasible solution is found, one hop neighbors are added into the subgraph. If a feasible solution is found when all one hop neighbor have been added to the subgraph, two hop neighbors are then gradually added to the subgraph and so on, until a feasible solution is found.

Figure 12:
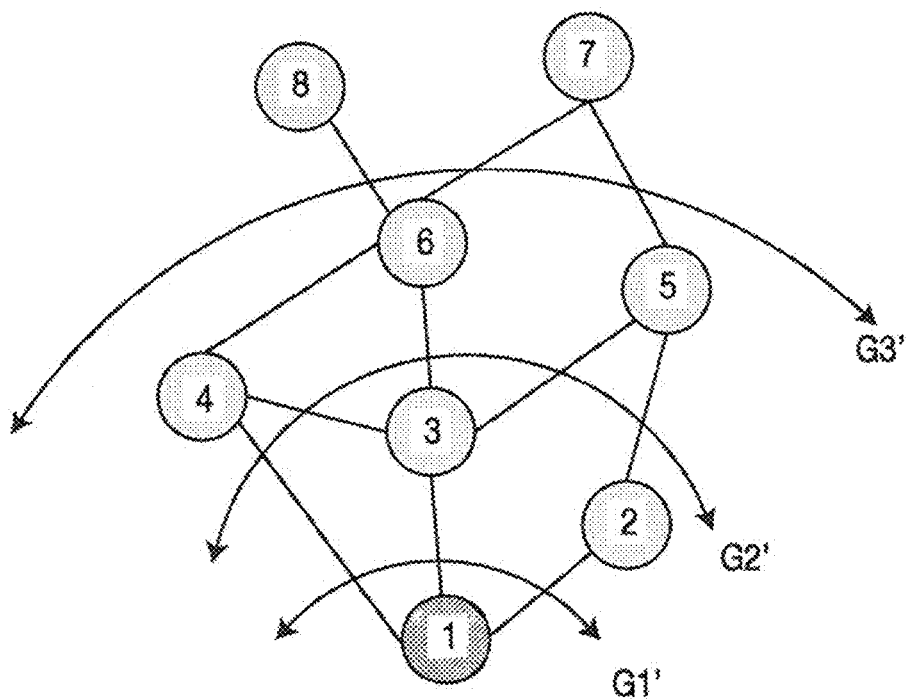
FIG. 12 is a diagram showing the use of the centralized method of the present invention for dynamic channel assignment/selection.

FIG. 12 shows an example of this process. For simplicity, an undirected line has been used to connect the interfering neighbors instead of weighted arcs. It is also assumed for purposes of this example that all the nodes in the subgraph are cooperative nodes. When an event occurs such that node 1 becomes infeasible, a subgraph G1' is created that includes only node 1. When building the interference graph for this subgraph, the interfering neighbors of node 1 are assumed to be non-cooperative nodes. In this case, it is trivial to execute the optimized algorithm or heuristic algorithm. If no feasible solution is found, some of its one-hop neighbors, node 2 and node 3, are added into the subgraph (G2'). When building the interference graph of G2', all the interfering neighbors of nodes in G2', in this case nodes 4,5,6, are assumed to be non-cooperative nodes. This process continues until a feasible solution is found for the nodes in the subgraph. When a solution is found for the subgraph, nodes in the subgraph may need to switch to other channels, nodes not in the subgraph continue to work on the previous assigned channel.

Figure 13B:
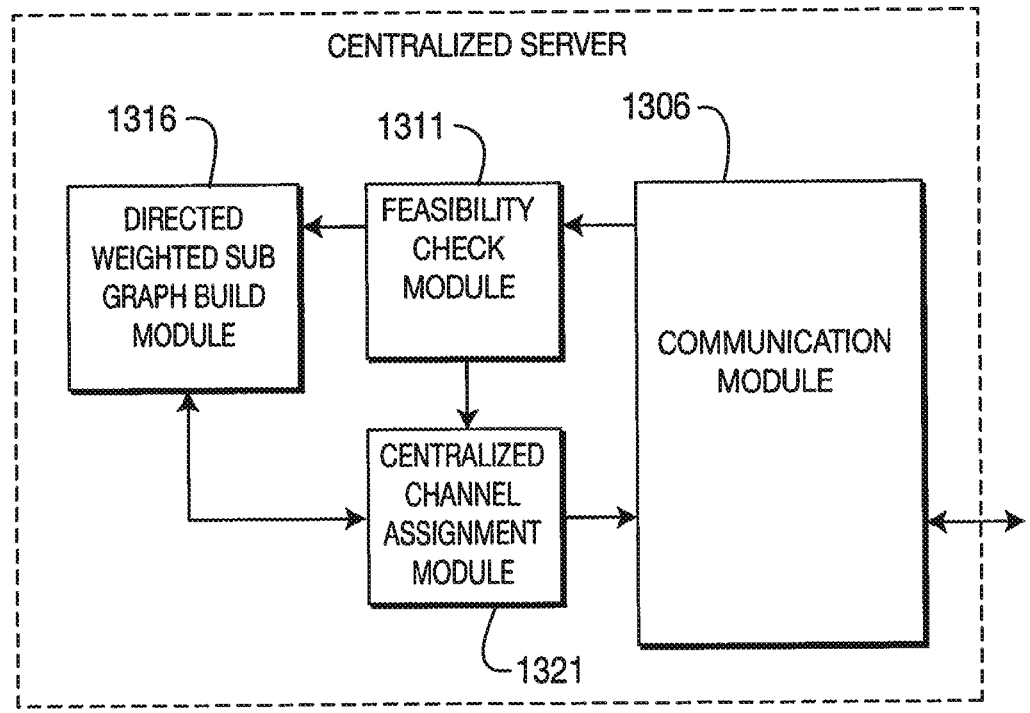
FIG. 13B is a block diagram of an exemplary embodiment of the present invention from the perspective of the centralized server for dynamic channel selection/assignment method.
Figure 13A:
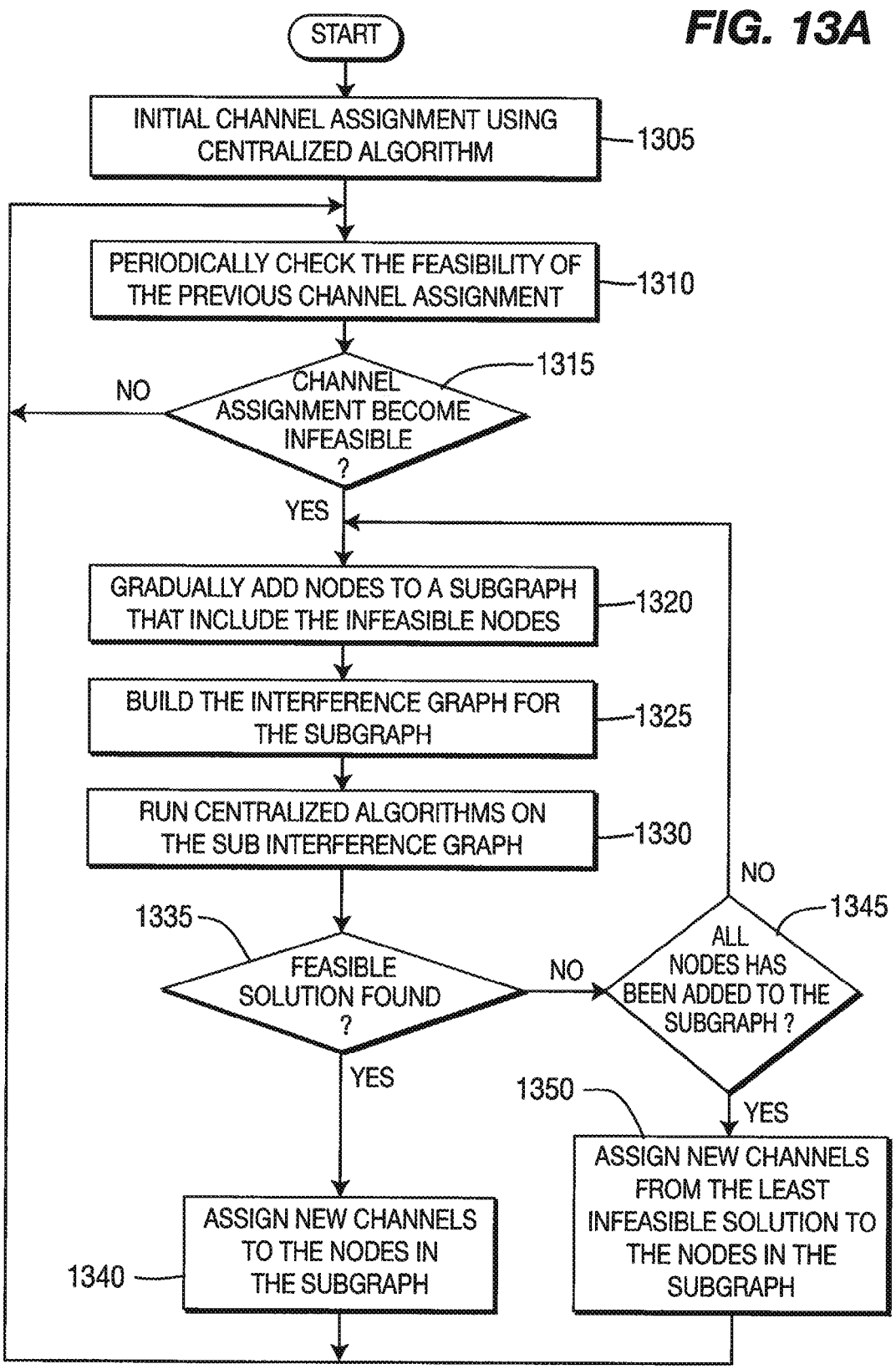
FIG. 13A is a flowchart of the centralized method for dynamic channel assignment.

FIG. 13A shows a flowchart of using centralized algorithm for dynamic channel assignment. At 1305 initial channel assignments are made using one of the centralized algorithms described above. The feasibility of the pervious channel assignments are periodically checked at 1310. A test is performed at 1315 to determine if any channel assignments have become infeasible. If no channel assignments have become infeasible then processing continues at 1310. If any channel assignments have become infeasible then at 1320 nodes are gradually added to the subgraph to include the infeasible nodes as described above. At 1325 an interference graph for the subgraph is built. At 1330 one of the centralized algorithms described above is executed using the interference graph of the subgraph. A test is performed at 1335 to determine if a feasible solution has been found. If a feasible solution has been found then at 1340 any new channel assignments are made and the nodes switch to the new channel assignments. The new channel assignments are transmitted in a message to the APs for the APs and their associated clients/nodes. If a feasible solution has not been found then a test is performed at 1345 to determine if all nodes have been added to the subgraph. If all nodes have not as yet been added to the subgraph then processing continues to 1320. If all nodes have been added to the subgraph then new channels are assigned based on the least infeasible solution.

FIG. 13B is a block diagram of an exemplary implementation of the present invention for using centralized algorithm for dynamic channel assignment. It includes a communication module (1306), a feasibility check module, a directed weighted subgraph build module, and a centralized channel assignment module. The centralized channel assignment module is used to determine the initial channel assignment. The feasibility check module will continuously check the feasibility of the channel assignment. Once the channel assignment becomes infeasible, it will notify the directed weighted sub graph build module to build a subgraph that includes the infeasible node, and use the centralized channel assignment module to assign channels for the subgraph. Once a feasible solution is found, the channel assignment will be sent to the corresponding APs using the communication module.

It is to be understood that the present invention may be implemented in various forms of hardware (e.g. ASIC chip), software, firmware, special purpose processors, or a combination thereof, for example, within a server, an intermediate device (such as a wireless access point or a wireless router) or mobile device. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. An apparatus, comprising:
   a receive scan report module that receives a channel report from an associated access point and is in communication with a communication module, said channel report including interference information, hidden terminal information, exposed terminal information and demand of each client associated with said associated access point;
   a build directed weighted graph module that builds an interference graph responsive to said received channel report and is in communication with said receive scan report module;
   a determine channel assignment module that determines channel assignments based on said interference graph and is in communication with a form and solve optimized problem module, said form and solve optimized problem module in communication with said build directed weighted graph module; and said communication module transmitting a channel assignment message to said associated access point and is in communication with said determine channel assignment module.

2. The apparatus according to claim 1, further comprising said form and solve optimized problem module formulating an optimization problem based on said interference graph and solving said optimization problem.

3. The apparatus according to claim 1, further comprising:
a sort nodes and select nodes for channel assignment module that sorts nodes of said interference graph into a list and is in communication with said build directed weighted graph module is also in communication with said determine channel assignment module;
said sort nodes and select nodes for channel assignment module selecting a node from said sorted list and
determining if a channel is available; and
said determine channel assignment module assigning said channel to said selected node.

4. The apparatus according to claim 3, wherein said assigned channel is one of a feasible channel with a lowest load and an infeasible channel with a lowest load.

5. The apparatus according to claim 1, further comprising a determine hidden exposed node list module determining a hidden terminal list and forwarding said hidden terminal list to said communication module, said communication module transmitting a hidden terminal list to said associated access point.

6. The apparatus according to claim 1, further comprising a determine hidden exposed node list module determining an exposed terminal list and forwarding said exposed terminal list to said communication module, said communication module transmitting an exposed terminal list to said associated access point.

7. The apparatus according to claim 3, wherein said sort nodes and select nodes for channel assignment module accomplishes said sorting by sorting said nodes in descending order.

8. The apparatus according to claim 3, wherein said sort nodes and select nodes for channel assignment module accomplishes said sorting using an in-degree.

9. The apparatus according to claim 3, wherein said sort nodes and select nodes for channel assignment module accomplishes said sorting using an out-degree.

10. The apparatus according to claim 3, wherein said sort nodes and select nodes for channel assignment module accomplishes said sorting using a sum of an in-degree and an out-degree.

11. The apparatus according to claim 3, wherein said sort nodes and select nodes for channel assignment module accomplishes said sorting using an accumulated load.

12. The apparatus according to claim 1, wherein said interference graph is a directed weighted edge interference graph.

13. The apparatus according to claim 1, further comprising:
said build directed weighted graph module periodically checking the feasibility of said channel assignments;
said build directed weighted graph module determining if said channel assignments have become infeasible;
said build directed weighted graph module creating a subgraph responsive to said determination;
said build directed weighted graph module building an interference graph for said subgraph;
said determine channel assignment module determining new channel assignments responsive to said interference graph; and
said communication module transmitting said new channel assignments to said associated access point.

14. The apparatus according to claim 13, further comprising
said build directed weighted graph module determining if said new channel assignments are feasible and
adding nodes to said subgraph responsive to said feasibility determination.

15. The apparatus according to claim 1, further comprising:
a genetic algorithm module that determines a genome representation and is in communication with said build directed weighted graph module and is also in communication with said determine channel assignment module;
said genetic algorithm module determining a fitness function;
said genetic algorithm module selecting a genetic algorithm;
said genetic algorithm module initializing a population of said genome representation;
said genetic algorithm module updating said population responsive to said selected genetic algorithm;
said genetic algorithm module testing said updated population based on said fitness function; and
said genetic algorithm module selecting a solution from said populations.

16. The apparatus according to claim 15, wherein said genetic algorithm used for updating said population is mutation.

17. The apparatus according to claim 15, wherein said genetic algorithm used for updating said population is crossover.

* * * * *